(12) United States Patent
Qiu et al.

(10) Patent No.: US 10,447,742 B2
(45) Date of Patent: Oct. 15, 2019

(54) INFORMATION SHARING METHOD AND DEVICE

(71) Applicant: Huawei Technologies Co., Ltd., Shenzhen (CN)

(72) Inventors: Zhihong Qiu, Shenzhen (CN); Li Li, Bridgewater, NJ (US); Tao Cai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 15/358,610

(22) Filed: Nov. 22, 2016

(65) Prior Publication Data

US 2017/0078343 A1    Mar. 16, 2017

Related U.S. Application Data

(63) Continuation of application No. PCT/CN2014/078315, filed on May 23, 2014.

(51) Int. Cl.
*G06F 15/16* (2006.01)
*H04L 29/06* (2006.01)
(Continued)

(52) U.S. Cl.
CPC .......... *H04L 65/4015* (2013.01); *H04L 51/18* (2013.01); *H04L 65/1093* (2013.01);
(Continued)

(58) Field of Classification Search
CPC .................................................. G06F 16/958
See application file for complete search history.

(56) References Cited

U.S. PATENT DOCUMENTS 7,072,984 B1 * 7/2006 Polonsky ............ H04L 67/2823
709/246
7,149,776 B1   12/2006 Roy et al.
(Continued)

FOREIGN PATENT DOCUMENTS

CN       1783090 A      6/2006
CN    101694660 A      4/2010
(Continued)

OTHER PUBLICATIONS

Machine Translation and Abstract of Chinese Publication No. CN101694660, dated Apr. 14, 2010, 26 pages.
(Continued)

*Primary Examiner* — Hieu T Hoang
(74) *Attorney, Agent, or Firm* — Conley Rose, P.C.

(57) ABSTRACT

An information sharing solution includes sending, by a first client, a uniform resource locator (URL) of a to-be-shared web page to a reverse proxy server, then acquiring a sharing URL from the reverse proxy server, acquiring, according to the sharing URL, a first to-be-shared web page that includes user background information of the first client, and sending the sharing URL to a second client, after URL synchronization between the first client and the second client, sending a document object model (DOM) of the first client to the second client such that the second client modifies a DOM of the second client according to the DOM of the first client to keep the DOM of the second client synchronized with the DOM of the first client, and after DOM synchronization between the first client and the second client, information sharing is implemented between two users.

34 Claims, 8 Drawing Sheets

(51) Int. Cl.
  H04L 29/08 (2006.01)
  H04L 12/58 (2006.01)
  H04L 12/18 (2006.01)

(52) U.S. Cl.
  CPC ........ H04L 67/025 (2013.01); H04L 67/2804 (2013.01); H04L 67/2895 (2013.01); H04L 67/306 (2013.01); *H04L 12/1827* (2013.01)

(56) References Cited

U.S. PATENT DOCUMENTS

| | | | |
|---|---|---|---|
| 7,793,255 B1* | 9/2010 | Kawaguchi | G06F 16/86 717/100 |
| 8,225,191 B1* | 7/2012 | Kalman | G06F 16/954 715/203 |
| 8,739,044 B1* | 5/2014 | Varadarajan | G06F 3/0481 709/204 |
| 8,775,923 B1* | 7/2014 | Kroeger | G06F 16/9574 715/234 |
| 8,806,024 B1* | 8/2014 | Toba Francis | G06Q 10/10 709/227 |
| 8,843,816 B2 | 9/2014 | Stull et al. | |
| 9,391,832 B1* | 7/2016 | Song | H04L 29/14 |
| 9,495,081 B2* | 11/2016 | Paniagua | G06F 3/0484 |
| 9,613,011 B2* | 4/2017 | Lund | H04W 4/21 |
| 2008/0010629 A1 | 1/2008 | Berg et al. | |
| 2008/0209533 A1* | 8/2008 | Abrams | G06F 21/62 726/9 |
| 2008/0215964 A1* | 9/2008 | Abrams | G06F 17/21 715/246 |
| 2008/0215965 A1* | 9/2008 | Abrams | G06F 16/958 715/246 |
| 2008/0215967 A1* | 9/2008 | Abrams | G06F 16/958 715/255 |
| 2008/0215985 A1* | 9/2008 | Batchelder | G06F 17/211 715/731 |
| 2008/0313206 A1 | 12/2008 | Kordun et al. | |
| 2009/0037517 A1* | 2/2009 | Frei | G06F 16/972 709/202 |
| 2009/0271713 A1 | 10/2009 | Stull et al. | |
| 2010/0306642 A1* | 12/2010 | Lowet | H04L 67/1095 715/234 |
| 2011/0055395 A1 | 3/2011 | Wang et al. | |
| 2013/0339459 A1 | 12/2013 | Kumashio | |
| 2014/0067934 A1 | 3/2014 | Ware et al. | |
| 2014/0068415 A1* | 3/2014 | Halevi | G06F 16/954 715/234 |
| 2014/0181947 A1* | 6/2014 | Lund | H04L 63/08 726/9 |
| 2015/0309971 A1* | 10/2015 | Cowley | G06F 9/44526 715/234 |
| 2015/0332348 A1* | 11/2015 | Das | G06Q 30/0269 705/14.71 |

FOREIGN PATENT DOCUMENTS

| | | |
|---|---|---|
| CN | 10211454 A | 6/2011 |
| CN | 102111454 A | 6/2011 |
| CN | 102420782 A | 4/2012 |
| CN | 102637193 A | 8/2012 |
| WO | 2014014695 A1 | 1/2014 |

OTHER PUBLICATIONS

Machine Translation and Abstract of Chinese Publication No. CN102637193, dated Aug. 15, 2012, 9 pages.
Foreign Communication From a Counterpart Application, Chinese Application No. 201480038256.X, Chinese Office Action dated Feb. 12, 2018, 10 pages.
"Series T: Terminals for Telematic Services, Data Protocols for Multimedia Conferencing, Multipoint application sharing," ITU-T, T.128, Jun. 2008, 204 pages.
Foreign Communication From a Counterpart Application, European Application No. 14892469.9, Extended European Search Report dated May 17, 2017, 10 pages.
Foreign Communication From a Counterpart Application, PCT Application No. PCT/CN2014/078315, English Translation of International Search Report dated Feb. 2, 2015, 2 pages.
Foreign Communication From a Counterpart Application, PCT Application No. PCT/CN2014/078315, English Translation of Written Opinion dated Feb. 2, 2015, 7 pages.

* cited by examiner

INFORMATION SHARING METHOD AND DEVICE

CROSS-REFERENCE TO RELATED APPLICATIONS

This application is a continuation of International Application No. PCT/CN2014/078315, filed on May 23, 2014, the disclosure of which is hereby incorporated by reference in its entirety.

TECHNICAL FIELD

The present disclosure relates to communications technologies, and in particular, to an information sharing method and a device.

BACKGROUND

Desktop sharing and document sharing are important functions in enterprise office communication. When communicating using a text and a voice, a user can transfer local information such as a document in a computer of the user to another party using desktop sharing and document sharing such that the other party obtains more information. Similarly, there is also a similar information sharing requirement in communication based on a web technology. For example, in enterprise communication or electronic commerce, a user browses some data such as a text, a picture, audio, and a video on the Internet, or browses an internal document of an enterprise, product information in electronic commerce, and the like. In this case, the user expects to learn more information by communicating with a colleague or customer service.

In the web field, a browser such as chrome also has a screen image acquiring function, and the function is combined with a web real-time communication (WebRTC) technology to implement information sharing. In an existing web co-browsing technology, synchronization is generally performed using a uniform resource locator (URL), that is, a sharing initiator sends a URL of the sharing initiator to a sharing receiver, and the sharing receiver opens the URL and obtains a same web page from a server. However, even if the sharing initiator and the sharing receiver open a same URL, web pages viewed by users of the two communication parties are still different because of different user background information. Therefore, information sharing cannot be implemented between the two communication parties.

SUMMARY

Embodiments of the present disclosure provide an information sharing method and a device such that information sharing can be implemented between two communication parties with different user background information.

A first aspect of the present disclosure provides an information sharing method, including sending, by a first client, a URL of a to-be-shared web page to a reverse proxy server using a communication web page such that the reverse proxy server maps the URL of the to-be-shared web page and a URL of the communication web page to a sharing URL, where the sharing URL includes a sharing URL of the to-be-shared web page and a sharing URL of the communication web page, receiving, by the first client, the sharing URL sent by the reverse proxy server, acquiring, by the first client, a first to-be-shared web page according to the sharing URL, where the first to-be-shared web page includes user background information of the first client, sending, by the first client, the sharing URL to a second client such that the second client acquires a second to-be-shared web page according to the sharing URL, where the second to-be-shared web page does not include the user background information of the first client, and sending, by the first client, a document object model (DOM) of the first client to the second client, where the DOM of the first client corresponds to the first to-be-shared web page such that the second client modifies a DOM of the second client according to the DOM of the first client, and generates the first to-be-shared web page according to a modified DOM of the second client and the second to-be-shared web page.

With reference to the first aspect of the present disclosure, in a first possible implementation manner of the first aspect of the present disclosure, the acquiring, by the first client, a first to-be-shared web page according to the sharing URL includes acquiring, by the first client, a combined web page according to the sharing URL, where the communication web page and the to-be-shared web page are displayed on the combined web page, and a URL of the combined web page is the sharing URL, and acquiring, by the first client, the first to-be-shared web page using the combined web page and the user background information of the first client.

With reference to the first possible implementation manner of the first aspect of the present disclosure, in a second possible implementation manner of the first aspect of the present disclosure, the acquiring, by the first client, a combined web page according to the sharing URL includes embedding, by the first client, the to-be-shared web page into the communication web page according to the sharing URL of the communication web page and the sharing URL of the to-be-shared web page that are in the sharing URL to form the combined web page, or receiving, by the first client using the sharing URL, the combined web page sent by the reverse proxy server, where the combined web page is generated by the reverse proxy server by inserting the communication web page into the to-be-shared web page in a plug-in manner.

With reference to the first or the second possible implementation manners of the first aspect of the present disclosure, in a third possible implementation manner of the first aspect of the present disclosure, the user background information includes a cookie and a session that correspond to the to-be-shared web page, and the acquiring, by the first client, the first to-be-shared web page using the combined web page and the user background information of the first client includes sending, by the first client, a request to the reverse proxy server using the combined web page to acquire the first to-be-shared web page, where the request includes the cookie, and the cookie includes an identifier (ID) of the session, and receiving, by the first client, the first to-be-shared web page from the reverse proxy server, where the first to-be-shared web page is acquired from a shared website by the reverse proxy server according to the request.

With reference to the third possible implementation manner of the first aspect of the present disclosure, in a fourth possible implementation manner of the first aspect of the present disclosure, the sending, by the first client, a request to the reverse proxy server using the combined web page to acquire the first to-be-shared web page includes sending, by the first client, a first page request to the reverse proxy server, where the first page request includes the sharing URL of the to-be-shared web page and the cookie, and the cookie includes the session ID such that the reverse proxy server modifies the sharing URL of the to-be-shared web page to the URL of the to-be-shared web page to generate a second page request, and sends the second page request to the shared website, and the receiving, by the first client, the first to-be-shared web page from the reverse proxy server includes receiving, by the first client, a first page response, where the first page response includes content of the first to-be-shared web page, and the first page response is sent by the reverse proxy server to the first client according to a second page response returned by the shared website with respect to the second page request.

With reference to the first or the second possible implementation manners of the first aspect of the present disclosure, in a fifth possible implementation manner of the first aspect of the present disclosure, the user background information includes a cookie, a session, and user permission information that correspond to the to-be-shared web page, and the acquiring, by the first client, the first to-be-shared web page using the combined web page and the user background information of the first client includes sending, by the first client, a first page request to the reverse proxy server, where the first page request includes the sharing URL of the to-be-shared web page, the cookie, and the user permission information, and the cookie includes an ID of the session such that the reverse proxy server modifies the sharing URL of the to-be-shared web page to the URL of the to-be-shared web page to generate a second page request, and sends the second page request to a shared website, and receiving, by the first client, a first page response, where the first page response includes content of the first to-be-shared web page, the content of the first to-be-shared web page is determined by the shared website according to the user background information, and the first page response is sent by the reverse proxy server to the first client according to a second page response returned by the shared website with respect to the second page request.

With reference to any one of the first aspect of the present disclosure and the first to the fifth possible implementation manners of the first aspect, in a sixth possible implementation manner of the first aspect of the present disclosure, before the sending, by the first client, a DOM of the first client to the second client, the method further includes hiding, by the first client according to a setting, information that needs to be kept secret.

With reference to the first aspect of the present disclosure or the first to the sixth possible implementation manners of the first aspect, in a seventh possible implementation manner of the first aspect of the present disclosure, the method further includes, when the first client determines that the DOM of the first client has changed, sending, by the first client, change information of the DOM of the first client to the second client such that the second client modifies the DOM of the second client according to the change information.

With reference to the first aspect of the present disclosure or the first to the sixth possible implementation manners of the first aspect, in an eighth possible implementation manner of the first aspect of the present disclosure, the method further includes, when the first client detects input information entered using an input device, sending the input information to the second client such that the second client modifies the DOM of the second client according to the input information.

A second aspect of the present disclosure provides an information sharing method, including receiving, by a second client, a sharing URL sent by a first client, where the sharing URL is obtained by mapping by a reverse proxy server according to a URL of a to-be-shared web page and a URL of a communication web page, where the URL of the to-be-shared web page is sent by the first client using the communication web page, and the sharing URL includes a sharing URL of the to-be-shared web page and a sharing URL of the communication web page, acquiring, by the second client, a second to-be-shared web page according to the sharing URL, where the second to-be-shared web page does not include user background information of the first client, receiving, by the second client, a DOM of the first client sent by the first client, where the DOM of the first client corresponds to a first to-be-shared web page, and the first to-be-shared web page includes the user background information of the first client, and modifying, by the second client, a DOM of the second client according to the DOM of the first client, and generating the first to-be-shared web page according to a modified DOM of the second client and the second to-be-shared web page.

With reference to the second aspect of the present disclosure, in a first possible implementation manner of the second aspect of the present disclosure, the acquiring, by the second client, a second to-be-shared web page according to the sharing URL includes sending, by the second client, a first page request to the reverse proxy server, where the first page request includes the sharing URL of the to-be-shared web page such that the reverse proxy server modifies the sharing URL of the to-be-shared web page to the URL of the to-be-shared web page to generate a second page request, and sends the second page request to a shared website, and receiving, by the second client, a first page response, where the first page response includes content of the second to-be-shared web page, and the first page response is sent by the reverse proxy server to the second client according to a second page response returned by the shared website with respect to the second page request.

With reference to the second aspect of the present disclosure or the first possible implementation manner of the second aspect, in a second possible implementation manner of the second aspect of the present disclosure, the method further includes receiving, by the second client, change information that is of the DOM of the first client and is sent by the first client, and modifying the DOM of the second client according to the change information, where the change information is sent by the first client to the second client when it is detected that the DOM of the first client has changed.

With reference to the second aspect of the present disclosure or the first possible implementation manner of the second aspect, in a third possible implementation manner of the second aspect of the present disclosure, the method further includes receiving, by the second client, input information sent by the first client, and modifying the DOM of the second client according to the input information, where the input information is sent by the first client to the second client when it is detected that a user has entered the input information using an input device.

A third aspect of the present disclosure provides an information sharing method, including receiving, by a reverse proxy server, a URL that is of a to-be-shared web page and is sent by a client using a communication web page, mapping, by the reverse proxy server, the URL of the to-be-shared web page and a URL of the communication web page to a sharing URL, where the sharing URL includes a sharing URL of the to-be-shared web page and a sharing URL of the communication web page, and sending, by the reverse proxy server, the sharing URL to the client such that the client acquires the to-be-shared web page according to the sharing URL, where the to-be-shared web page includes user background information of the client.

With reference to the third aspect of the present disclosure, in a first possible implementation manner of the third aspect of the present disclosure, the user background information includes a cookie and a session that correspond to the to-be-shared web page, and the method further includes receiving, by the reverse proxy server, a request sent by the client, where the request includes the cookie, and the cookie includes an IDID of the session, and acquiring, by the reverse proxy server, the to-be-shared web page from a shared website according to the request, and sending the to-be-shared web page to the client.

With reference to the first possible implementation manner of the third aspect of the present disclosure, in a second possible implementation manner of the third aspect of the present disclosure, the receiving, by the reverse proxy server, a request sent by the client includes receiving, by the reverse proxy server, a first page request sent by the client, where the first page request includes the sharing URL of the to-be-shared web page and the cookie, and the cookie includes the session ID, and the acquiring, by the reverse proxy server, the to-be-shared web page from a shared website according to the request, and sending the to-be-shared web page to the client includes modifying, by the reverse proxy server, the sharing URL of the to-be-shared web page and in the first page request to the URL of the to-be-shared web page to generate a second page request, and sending the second page request to the shared website, receiving, by the reverse proxy server, a second page response sent by the shared website, where the second page response includes the URL of the to-be-shared web page and content of the to-be-shared web page, and modifying, by the reverse proxy server, the URL of the to-be-shared web page and in the second page response to the sharing URL of the to-be-shared web page to generate a first page response, and sending the first page response to the client, where the first page response includes the content of the to-be-shared web page.

With reference to the third aspect of the present disclosure, in a third possible implementation manner of the third aspect of the present disclosure, the user background information includes a cookie, a session, and user permission information that correspond to the to-be-shared web page, and the method further includes receiving, by the reverse proxy server, a first page request sent by the client, where the first page request includes the sharing URL of the to-be-shared web page, the cookie, and the user permission information, and the cookie includes an ID of the session, modifying, by the reverse proxy server, the sharing URL of the to-be-shared web page and in the first page request to the URL of the to-be-shared web page to generate a second page request, and sending the second page request to a shared website, receiving, by the reverse proxy server, a second page response sent by the shared website, where the second page response includes the URL of the to-be-shared web page and content of the to-be-shared web page, and the content of the to-be-shared web page is determined by the shared website according to the user background information, and modifying, by the reverse proxy server, the URL of the to-be-shared web page and in the second page response to the sharing URL of the to-be-shared web page to generate a first page response, and sending the first page response to the client, where the first page response includes the content of the to-be-shared web page.

A fourth aspect of the present disclosure provides a first client, including a sending module configured to send a URL of a to-be-shared web page to a reverse proxy server using a communication web page such that the reverse proxy server maps the URL of the to-be-shared web page and a URL of the communication web page to a sharing URL, where the sharing URL includes a sharing URL of the to-be-shared web page and a sharing URL of the communication web page, a receiving module configured to receive the sharing URL sent by the reverse proxy server, and an acquiring module configured to acquire a first to-be-shared web page according to the sharing URL, where the first to-be-shared web page includes user background information of the first client, where the sending module is further configured to send the sharing URL to a second client such that the second client acquires a second to-be-shared web page according to the sharing URL, where the second to-be-shared web page does not include the user background information of the first client, and the sending module is further configured to send a DOM of the first client to the second client, where the DOM of the first client corresponds to the first to-be-shared web page such that the second client modifies a DOM of the second client according to the DOM of the first client, and generates the first to-be-shared web page according to a modified DOM of the second client and the second to-be-shared web page.

With reference to the fourth aspect of the present disclosure, in a first possible implementation manner of the fourth aspect of the present disclosure, the acquiring module includes a combined web page acquiring unit configured to acquire a combined web page according to the sharing URL, where the communication web page and the to-be-shared web page are displayed on the combined web page, and a URL of the combined web page is the sharing URL, and a to-be-shared web page acquiring unit configured to acquire the first to-be-shared web page using the combined web page and the user background information of the first client.

With reference to the first possible implementation manner of the fourth aspect of the present disclosure, in a second possible implementation manner of the fourth aspect of the present disclosure, the combined web page acquiring unit is configured to embed the to-be-shared web page into the communication web page according to the sharing URL of the communication web page and the sharing URL of the to-be-shared web page that are in the sharing URL to form the combined web page, or receive, using the sharing URL, the combined web page sent by the reverse proxy server, where the combined web page is generated by the reverse proxy server by inserting the communication web page into the to-be-shared web page in a plug-in manner.

With reference to the first or the second possible implementation manners of the fourth aspect of the present disclosure, in a third possible implementation manner of the fourth aspect of the present disclosure, the user background information includes a cookie and a session that correspond to the to-be-shared web page, and the to-be-shared web page acquiring unit is configured to send a request to the reverse proxy server using the combined web page to acquire the first to-be-shared web page, where the request includes the cookie, and the cookie includes an ID of the session, and receive the first to-be-shared web page from the reverse proxy server, where the first to-be-shared web page is acquired from a shared website by the reverse proxy server according to the request.

With reference to the third possible implementation manner of the fourth aspect of the present disclosure, in a fourth possible implementation manner of the fourth aspect of the present disclosure, the to-be-shared web page acquiring unit is configured to send a first page request to the reverse proxy server, where the first page request includes the sharing URL of the to-be-shared web page and the cookie, and the cookie includes the session ID such that the reverse proxy server modifies the sharing URL of the to-be-shared web page to the URL of the to-be-shared web page to generate a second page request, and sends the second page request to the shared website, and receive a first page response, where the first page response includes content of the first to-be-shared web page, and the first page response is sent by the reverse proxy server to the first client according to a second page response returned by the shared website with respect to the second page request.

With reference to the first or the second possible implementation manners of the fourth aspect of the present disclosure, in a fifth possible implementation manner of the fourth aspect of the present disclosure, the user background information includes a cookie, a session, and user permission information that correspond to the to-be-shared web page, and the to-be-shared web page acquiring unit is configured to send a first page request to the reverse proxy server, where the first page request includes the sharing URL of the to-be-shared web page, the cookie, and the user permission information, and the cookie includes an ID of the session such that the reverse proxy server modifies the sharing URL of the to-be-shared web page to the URL of the to-be-shared web page to generate a second page request, and sends the second page request to a shared website, and receive a first page response, where the first page response includes content of the first to-be-shared web page, the content of the first to-be-shared web page is determined by the shared website according to the user background information, and the first page response is sent by the reverse proxy server to the first client according to a second page response returned by the shared website with respect to the second page request.

With reference to any one of the fourth aspect of the present disclosure and the first to the fifth possible implementation manners of the fourth aspect, in a sixth possible implementation manner of the fourth aspect of the present disclosure, before the first client sends the DOM of the first client to the second client, the method further includes a hiding module configured to, before the sending module sends the DOM of the first client to the second client, hide, according to a setting, information that needs to be kept secret.

With reference to any one of the fourth aspect of the present disclosure and the first to the sixth possible implementation manners of the fourth aspect, in a seventh possible implementation manner of the fourth aspect of the present disclosure, the client further includes a detection module configured to determine whether the DOM of the first client has changed, where the sending module is further configured to, when the detection module determines that the DOM of the first client has changed, send change information of the DOM of the first client to the second client such that the second client modifies the DOM of the second client according to the change information.

With reference to any one of the fourth aspect of the present disclosure and the first to the sixth possible implementation manners of the fourth aspect, in an eighth possible implementation manner of the fourth aspect of the present disclosure, the client further includes a detection module configured to detect input information entered using an input device, where the sending module is further configured to, when the detection module detects the input information entered using the input device, send the input information to the second client such that the second client modifies the DOM of the second client according to the input information.

A fifth aspect of the present disclosure provides a second client, including a receiving module configured to receive a sharing URL sent by a first client, where the sharing URL is obtained by mapping by a reverse proxy server according to a URL of a to-be-shared web page and a URL of a communication web page, where the URL of the to-be-shared web page is sent by the first client using the communication web page, and the sharing URL includes a sharing URL of the to-be-shared web page and a sharing URL of the communication web page, an acquiring module configured to acquire a second to-be-shared web page according to the sharing URL, where the second to-be-shared web page does not include user background information of the first client, where the receiving module is further configured to receive a DOM of the first client sent by the first client, where the DOM of the first client corresponds to a first to-be-shared web page, and the first to-be-shared web page includes the user background information of the first client, and a modification module configured to modify a DOM of the second client according to the DOM of the first client, and generate the first to-be-shared web page according to a modified DOM of the second client and the second to-be-shared web page.

With reference to the fifth aspect of the present disclosure, in a first possible implementation manner of the fifth aspect of the present disclosure, the acquiring module is configured to send a first page request to the reverse proxy server, where the first page request includes the sharing URL of the to-be-shared web page such that the reverse proxy server modifies the sharing URL of the to-be-shared web page to the URL of the to-be-shared web page to generate a second page request, and sends the second page request to a shared website, and receive a first page response, where the first page response includes content of the second to-be-shared web page, and the first page response is sent by the reverse proxy server to the second client according to a second page response returned by the shared website with respect to the second page request.

With reference to the fifth aspect of the present disclosure or the first possible implementation manner of the fifth aspect, in a second possible implementation manner of the fifth aspect of the present disclosure, the receiving module is further configured to receive change information that is of the DOM of the first client and is sent by the first client, where the change information is sent by the first client to the second client when it is detected that the DOM of the first client has changed, and the modification module is further configured to modify the DOM of the second client according to the change information.

With reference to the fifth aspect of the present disclosure or the first possible implementation manner of the fifth aspect, in a third possible implementation manner of the fifth aspect of the present disclosure, the receiving module is further configured to receive input information sent by the first client, where the input information is sent by the first client to the second client when it is detected that a user has entered the input information using an input device, and the modification module is further configured to modify the DOM of the second client according to the input information.

A sixth aspect of the present disclosure provides a reverse proxy server, including a receiving module configured to receive a URL that is of a to-be-shared web page and is sent by a client using a communication web page, a mapping module configured to map the URL of the to-be-shared web page and a URL of the communication web page to a sharing URL, where the sharing URL includes a sharing URL of the to-be-shared web page and a sharing URL of the communication web page, and a sending module configured to send the sharing URL to the client such that the client acquires the to-be-shared web page according to the sharing URL, where the to-be-shared web page includes user background information of the client.

With reference to the sixth aspect of the present disclosure, in a first possible implementation manner of the sixth aspect of the present disclosure, the user background information includes a cookie and a session that correspond to the to-be-shared web page, and the reverse proxy server further includes an acquiring module, the receiving module is further configured to receive a request sent by the client, where the request includes the cookie, and the cookie includes an ID of the session, and the acquiring module is configured to acquire the to-be-shared web page from a shared website according to the request, and send the to-be-shared web page to the client.

With reference to the first possible implementation manner of the sixth aspect of the present disclosure, in a second possible implementation manner of the sixth aspect of the present disclosure, the receiving module is configured to receive a first page request sent by the client, where the first page request includes the sharing URL of the to-be-shared web page and the cookie, and the cookie includes the session ID, and the acquiring module is configured to modify the sharing URL of the to-be-shared web page and in the first page request to the URL of the to-be-shared web page to generate a second page request, and send the second page request to the shared website, receive a second page response sent by the shared website, where the second page response includes the URL of the to-be-shared web page and content of the to-be-shared web page, and modify the URL of the to-be-shared web page and in the second page response to the sharing URL of the to-be-shared web page to generate a first page response, and send the first page response to the client, where the first page response includes the content of the to-be-shared web page.

With reference to the sixth aspect of the present disclosure, in a third possible implementation manner of the sixth aspect of the present disclosure, the user background information includes a cookie, a session, and user permission information that correspond to the to-be-shared web page, and the reverse proxy server further includes an acquiring module, the receiving module is further configured to receive a first page request sent by the client, where the first page request includes the sharing URL of the to-be-shared web page, the cookie, and the user permission information, and the cookie includes an ID of the session, the acquiring module is configured to modify the sharing URL of the to-be-shared web page and in the first page request to the URL of the to-be-shared web page to generate a second page request, and send the second page request to a shared website, the receiving module is further configured to receive a second page response sent by the shared website, where the second page response includes the URL of the to-be-shared web page and content of the to-be-shared web page, and the content of the to-be-shared web page is determined by the shared website according to the user background information, the acquiring module is further configured to modify the URL of the to-be-shared web page and in the second page response to the sharing URL of the to-be-shared web page to generate a first page response, where the first page response includes the content of the to-be-shared web page, and the sending module is further configured to send the first page response to the client.

A seventh aspect of the present disclosure provides a first client, including a processor, a memory, and a system bus, where the processor and the memory are connected using the system bus and implement communication with each other using the system bus, the memory is configured to store a computer executable instruction, and the processor is configured to run the computer executable instruction to execute the method according to any one of possible implementation manners in the first aspect.

An eighth aspect of the present disclosure provides a second client, including a processor, a memory, and a system bus, where the processor and the memory are connected using the system bus and implement communication with each other using the system bus, the memory is configured to store a computer executable instruction, and the processor is configured to run the computer executable instruction to execute the method according to any one of possible implementation manners in the second aspect.

A ninth aspect of the present disclosure provides a reverse proxy server, including a processor, a memory, and a system bus, where the processor and the memory are connected using the system bus and implement communication with each other using the system bus, the memory is configured to store a computer executable instruction, and the processor is configured to run the computer executable instruction to execute the method according to any one of possible implementation manners in the third aspect.

According to the information sharing method and the device in the embodiments of the present disclosure, a first client sends a URL of a to-be-shared web page to a reverse proxy server using a communication web page such that the reverse proxy server maps the URL of the to-be-shared web page and a URL of the communication web page to a sharing URL, then the first client acquires the sharing URL, acquires, according to the sharing URL, a first to-be-shared web page that includes user background information of the first client, and sends the sharing URL to a second client to implement URL synchronization between the two parties, after the URL synchronization between the first client and the second client, the first client sends a DOM of the first client to the second client such that the second client modifies a DOM of the second client according to the DOM of the first client to keep the DOM of the second client synchronized with the DOM of the first client, and after DOM synchronization between the first client and the second client, information sharing is implemented between two users. According to the method, information synchronization between two communication parties can be implemented even if user background information of the two communication parties is different.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

Figure 1:
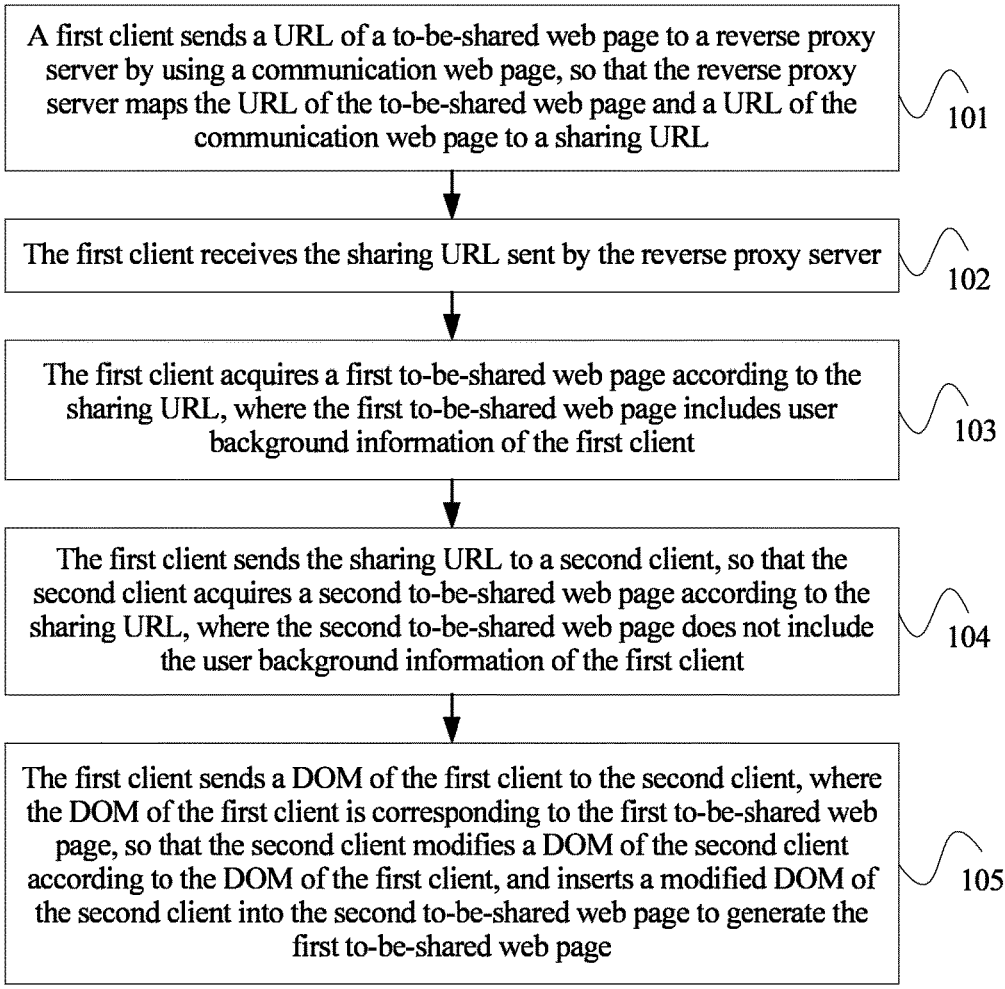
FIG. 1 is a flowchart of Embodiment 1 of an information sharing method according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure.

An existing web co-browsing technology is implemented by synchronizing URL of a sharing initiator and of a sharing receiver. That is, the sharing initiator sends a URL of a to-be-shared web page of the sharing initiator to the sharing receiver, and the sharing receiver opens the URL and obtains a same web page from a web server, that is, a shared website. However, in the existing web co-browsing technology, user background information is not considered. The user background information mainly refers to historical browsing data stored on the Internet and local historical browsing data stored in a client used by a user, and data acquired by the user by logging in to a website using user permission information, for example, a user name and a password. The local historical browsing data of the user refers to Cookie information stored in a terminal used by the user. A Cookie is generated on a website side, and is sent to a browser in a client for management. When requesting a same website next time, the browser sends the Cookie to the website side. In this way, the website side can learn whether the user is an authorized user, whether the user needs a re-login, and so on. The Cookie records a word typed on the website by the user or some selections, and when the user visits a same website again next time, the website side determines the user according to content in the Cookie, and sends specific web page content to the user. The historical browsing data on the Internet mainly refers to session information stored on a server side. A session is used to record user information, and the session is assigned by a server to the user when the client accesses the server for the first time. A session ID is stored in a cookie in the client, and content of the session is stored on the server side. When the user logs in to a website, the browser may use the session ID stored in the cookie to log in to the website.

Even if the sharing initiator and the sharing receiver open a same URL, users of the two parties view different web pages because of different user background information. For example, a user A has watched a video before on the SOHU website, and when the user A opens the SOHU website again to watch a video, a terminal of the user A automatically jumps, according to a local cookie, to a web page viewed by the user A last time. At this time, the user A needs to share the web page with a user B, and the user A sends a URL of the web page to the user B. However, because cookies of the user A and the user B are different, a web page opened by the user B according to the URL is different from the web page viewed by the user A.

One solution involves modifying a website on which a to-be-shared web page is located, and enabling, by means of setting, a shared website on which the to-be-shared web page is located to support a permission mechanism of shared logic, thereby implementing sharing. However, in this solution websites need to be modified to implement sharing of any website. Workloads of modifying websites are heavy, and it is impossible that all websites support permission sharing because of security concerns.

The embodiments of the present disclosure propose an information sharing method, and an objective of the method is to provide a secure co-browsing mechanism for general web-based communication software such that the communication software can share all web pages, and an information security problem of a user can be considered when a web page is shared. The communication software herein refers to any computer program (or a part of a program) that implements a communication function, which includes a "communication web page" or a part in the "communication web page" that is displayed on a client, and also includes a program and the like at a server side.

To implement the method in the embodiments of the present disclosure, the following problems need to be resolved.

(1) Domain crossing problem of the JAVA description language JAVAJAVASCRIPT: When a communication web page and a to-be-shared web page belong to different websites, communication software cannot acquire content of the to-be-shared web page because of a limitation of a same origin policy of JAVAJAVASCRIPT. The same origin policy is an extremely important security limitation in JAVAJAVASCRIPT. This policy limits page content that can be accessed using JAVAJAVASCRIPT code, that is, JAVAJAVASCRIPT can access only content that is in a same origin with a document that includes JAVAJAVASCRIPT, and the same origin refers to a same domain name, a same protocol, and a same port. The same origin policy prevents a document or a script loaded from an origin from acquiring or setting an attribute of a document loaded from another origin.

(2) URL synchronization problem: A web page is equivalent to a file organization, where a website of the web page points to a master file, and in the master file, another resource file is also referenced using a relative path, for example, files such as JAVAJAVASCRIPT, a cascading style sheet (CSS), and a picture. When the sharing initiator shares a web page, not only the master file is synchronized, but a URL also needs to be synchronized to maintain an organization structure between files.

After URL synchronization, two communication parties can theoretically obtain a same web page. However, because background information of the two communication parties is different, a website on which the to-be-shared web page is located returns different web pages, or results obtained by JAVAJAVASCRIPT execution may be different.

(3) DOM acquisition and synchronization problem: A DOM is a data structure obtained after web page parsing and JAVAJAVASCRIPT execution, and a final basis for a browser to render a web page. The sharing initiator needs to acquire a personalized to-be-shared web page according to user background information, and share the personalized to-be-shared web page to the sharing receiver.

For the foregoing three problems, the embodiments of the present disclosure propose the following solutions: (1) Domain crossing problem of JAVAJAVASCRIPT: A website on which a to-be-shared web page is located and a website on which a communication web page is located are mapped to a virtual website by establishing a reverse proxy server. A sharing initiator and a sharing receiver acquire content of the to-be-shared web page using a URL of the virtual website. The reverse proxy server means that a proxy server receives a connection request on the Internet, then forwards the request to a server on an internal network, and returns a result obtained from the server to a client that requests a connection on the Internet. However, a common proxy server only provides proxy service for a request of an internal network for connecting the Internet, and a common web proxy server does not support a request of an external network for accessing the internal network. When a proxy server can act for a host on the external network to access the internal network, a server that provides such proxy service is referred to as a reverse proxy server. (2) URL synchronization problem: A sharing initiator opens a to-be-shared web page using a reverse proxy server and sends a sharing URL to a sharing receiver, and the sharing receiver opens the to-be-shared web page using the URL, which implements URL synchronization. (3) DOM acquisition and synchronization problem: A sharing initiator acquires a personalized page of the sharing initiator according to user background information, and sends an entire or partial DOM of the sharing initiator to a sharing receiver, and the sharing receiver modifies content of a DOM of the sharing receiver such that DOMs of the two parties are synchronized. Only a brief overview of the solution in the embodiments of the present disclosure is provided here, and the following describes in detail the method of the embodiments of the present disclosure using specific embodiments.

FIG. 1 is a flowchart of Embodiment 1 of an information sharing method according to the present disclosure. As shown in FIG. 1, the method in this embodiment may include the following steps.

Step 101: A first client sends a URL of a to-be-shared web page to a reverse proxy server using a communication web page such that the reverse proxy server maps the URL of the to-be-shared web page and a URL of the communication web page to a sharing URL.

In an embodiment, a user A opens the communication web page on the first client, establishes a connection to a communication website, and enters the URL of the to-be-shared web page into the communication web page, where the communication website is a website on which the communication web page is located. The first client sends the URL of the to-be-shared web page to a communications server using the communication web page, where the communications server is a server in which the communication website is located. The communications server forwards the to-be-shared web page to the reverse proxy server. After receiving the URL of the to-be-shared web page, the reverse proxy server modifies a configuration of the reverse proxy server and maps the URL of the to-be-shared web page and the URL of the communication web page to the sharing URL, that is, the reverse proxy server maps the communication web page and the to-be-shared web page onto a same virtual website. The virtual website includes at least two sub-pages: the communication page and the to-be-shared page. A URL of the virtual website is the sharing URL, and the sharing URL includes at least two sub-URLs, which are respectively referred to as a sharing URL of the communication page and a sharing URL of the to-be-shared page. In the following, the sharing URL refers to a set including the two sub-URLs unless otherwise specified. In this way, when the to-be-shared web page and the communication web page are accessed using the reverse proxy server, the two web pages logically belong to a same website such that a domain crossing problem of JAVAJAVASCRIPT does not exist, and communication software on the first client can acquire content of the to-be-shared web page. The first client in this embodiment of the present disclosure acts as a sharing initiator.

Figure 2:
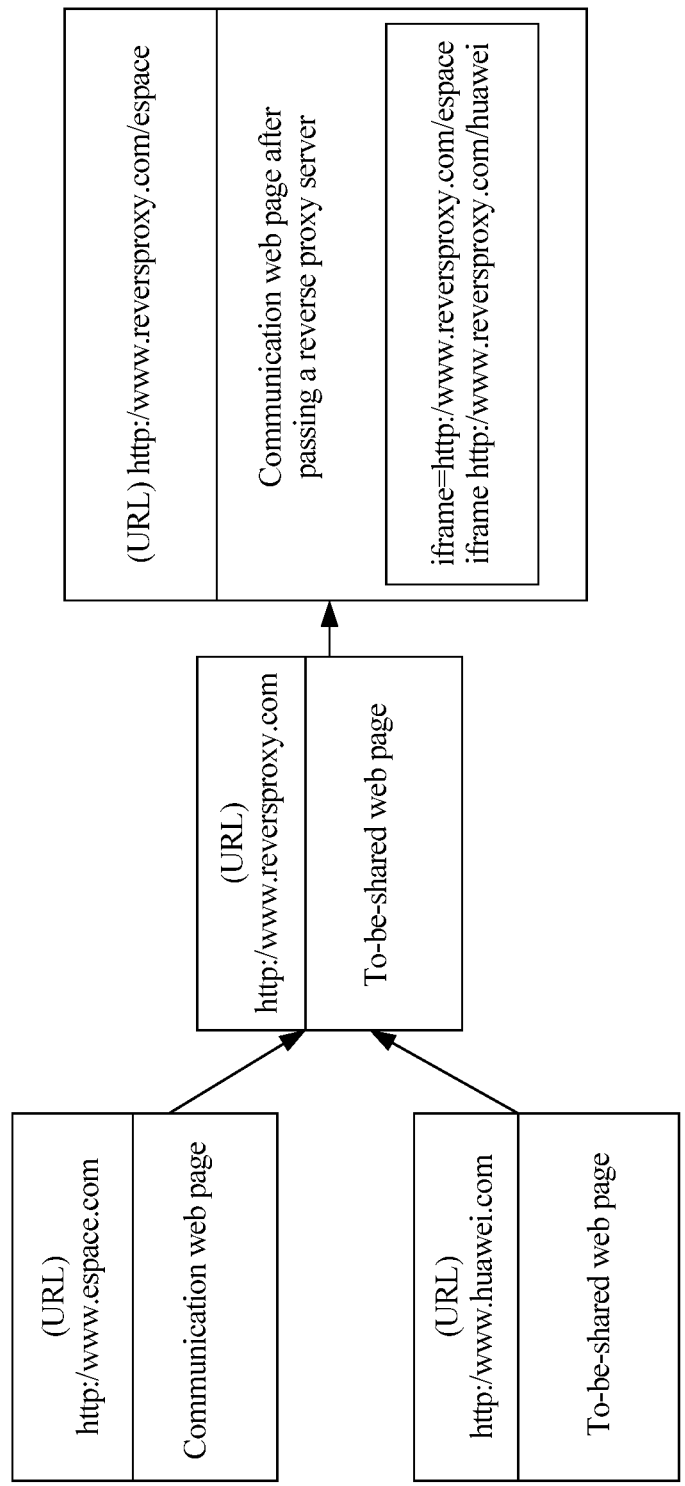
FIG. 2 is a schematic diagram of a web page mapping process according to an embodiment of the present disclosure.

As shown in FIG. 2, a user communicates using ESPACE communication software, the user needs to share a Huawei web page with another user, a web page displayed on the ESPACE communication software is a communication web page, and the Huawei web page is a to-be-shared web page. For example, a URL of the communication web page is http://www.espace.com, a URL of the to-be-shared web page is http://www.huawei.com, and a URL that is of a virtual website and is set by the reverse proxy server is http://www.reverseproxy.com. The reverse proxy server maps the communication web page and the to-be-shared web page onto the virtual website. A sharing URL that is of the communication web page and is obtained by mapping by the reverse proxy server is http://www.reverseproxy.com/espace, and a sharing URL that is of the to-be-shared web page and is obtained by mapping by the reverse proxy server is http://www.reverseproxy.com/huawei. The sharing URL of the to-be-shared web page and the sharing URL of the communication web page are collectively referred to as the sharing URL.

In the following, a website on which the to-be-shared web page is located is referred to as a shared website, a website on which the communication web page is located is referred to as a communication website, a server in which the sharing website is located is referred to as a sharing server, and a server in which the communication website is located is referred to as a communications server. The reverse proxy server may be provided on a same server with the communication website, or the reverse proxy server may act as a server independently.

Step 102: The first client receives the sharing URL sent by the reverse proxy server.

After the reverse proxy server maps the URL of the to-be-shared web page and the URL of the communication web page to the sharing URL, the reverse proxy server sends the sharing URL obtained by mapping to the first client. In an embodiment, the reverse proxy server first sends the sharing URL to a communications server, and the communications server forwards the sharing URL to the first client.

Step 103: The first client acquires a first to-be-shared web page according to the sharing URL, where the first to-be-shared web page includes user background information of the first client.

It should be noted that, that the first to-be-shared web page includes the user background information of the first client indicates that the first to-be-shared web page is generated according to the user background information, rather than indicating that the user background information is displayed on the first to-be-shared page.

That the first client acquires the first to-be-shared web page according to the sharing URL is acquiring, by the first client, a combined web page according to the sharing URL, and opening the to-be-shared web page using the combined web page, where the communication web page and the to-be-shared web page are displayed on the combined web page, and a URL of the combined web page is the sharing URL. The first client opens the to-be-shared web page using the combined web page, and acquires the first to-be-shared web page according to the user background information of the first client.

The first client acquires the combined web page in the following manners: In a first manner, the first client embeds the to-be-shared web page into the communication web page according to the sharing URL of the communication web page and the sharing URL of the to-be-shared web page that are in the sharing URL to form the combined web page. In a second manner, the first client receives, using the sharing URL, the combined web page sent by the reverse proxy server, where the combined web page is generated by the reverse proxy server by inserting the communication web page into the to-be-shared web page in a plug-in manner, when the to-be-shared web page passes the reverse proxy server.

In the first manner, after acquiring the sharing URL, the first client may embed the to-be-shared web page into the communication web page in an iframe manner. Generally, an iframe is used to include another page. For example, a user expects to load content of another website into a web page of a website of the user, which may be implemented by adding a URL of another website that needs to be loaded as a parameter. In this embodiment, the first client generates the combined web page by embedding the to-be-shared web page into the communication web page using an iframe. An example shown in FIG. 2 is still used as an example for description. The sharing URL of the to-be-shared web page is http://www.reverseproxy.com/huawei, and the sharing URL of the communication web page is http://www.reverseproxy.com/espace. The reverse proxy server uses the URL of the to-be-shared web page as a parameter, and therefore iframe=http://www.reverseproxy.com/huawei, and iframe=http://www.reverseproxy.com/espace. The to-be-shared web page and the communication web page are simultaneously displayed on the combined web page. The user opens the to-be-shared web page by clicking the sharing URL of the to-be-shared web page that is used to display the to-be-shared web page and is in the combined web page. It should be noted that for the sharing URL of the to-be-shared web page, different pages are displayed when the to-be-shared web page is opened according to different user background information. In the second manner, the reverse proxy server generates the combined web page. In an embodiment, when the to-be-shared web page passes the reverse proxy server, the reverse proxy server inserts the to-be-shared web page into the communication web page in a plug-in manner by modifying the content of the to-be-shared web page. In this way, the to-be-shared web page and the communication web page can be simultaneously displayed on the combined web page. The user opens the to-be-shared web page by clicking a sub-web page that is used to display the to-be-shared web page and is in the combined web page, that is, clicking the sharing URL of the to-be-shared web page.

The first client may acquire the first to-be-shared web page in the following two manners In one manner, the user background information includes a cookie and a session that correspond to the to-be-shared web page. That the first client acquires the first to-be-shared web page using the combined web page and the user background information of the first client is sending, by the first client, a request to the reverse proxy server using the combined web page to acquire the first to-be-shared web page, where the request includes the cookie, and the cookie includes an ID of the session, sending, by the reverse proxy server, the request of the first client to a shared website, determining, by the shared website, the session according to the session ID, and returning, according to the session and the cookie, the first to-be-shared page that includes the user background information of the first client, and acquiring, by the first client, the first to-be-shared web page from the reverse proxy server.

In an embodiment, that the first client sends the request to the reverse proxy server using the combined web page to acquire the first to-be-shared web page is sending, by the first client, a first page request to the reverse proxy server, where the first page request includes the sharing URL of the to-be-shared web page, the first page request further includes the cookie, and the cookie includes the session ID such that the reverse proxy server modifies the sharing URL of the to-be-shared web page to the URL of the to-be-shared web page to generate a second page request, and sends the second page request to the shared website. That the first client receives content of the first to-be-shared web page from the reverse proxy server is receiving, by the first client, a first page response, where the first page response includes the content of the first to-be-shared web page, and the first page response is sent by the reverse proxy server to the first client according to a second page response returned by the shared website with respect to the second page request. After receiving the second page request, the shared website returns the second page response to the reverse proxy server according to the URL of the to-be-shared web page and in the second page request. The reverse proxy server modifies the URL of the to-be-shared web page and in the second page response to the sharing URL of the to-be-shared web page to generate the first page response, and returns the first page response to the first client.

In the other manner, the user background information includes a cookie, a session, and user permission information that correspond to the to-be-shared web page, and the user permission information may be a user name, a password, and the like. That the first client acquires the first to-be-shared web page using the combined web page and the user background information of the first client is sending, by the first client, a first page request to the reverse proxy server, where the first page request includes the sharing URL of the to-be-shared web page and the user permission information, the first page request further includes the cookie, and the cookie includes an ID of the session such that the reverse proxy server modifies the sharing URL of the to-be-shared web page to the URL of the to-be-shared web page to generate a second page request, and sends the second page request to a shared website, then, receiving, by the first client, a first page response, where the first page response includes content of the first to-be-shared web page, the content of the first to-be-shared web page is jointly determined by the shared website according to the user permission information, the cookie, and the session, and the first page response is sent by the reverse proxy server to the first client according to a second page response returned by the shared website with respect to the second page request, and obtaining, by the first client, the first to-be-shared web page.

In the foregoing two manners, the reverse proxy server is mainly configured to, when receiving the first page request sent by the first client, modify the sharing URL of the to-be-shared page and in the first page request to the URL of the to-be-shared web page, then add the URL of the to-beshared web page into the second page request, and send the second page request to the shared website. For the shared website, the shared website can only identify the URL of the to-be-shared web page. Therefore, to acquire the content of the first to-be-shared web page, the first client needs to implement mutual conversion between the sharing URL of the to-be-shared web page and the URL of the to-be-shared web page using the reverse proxy server.

The cookie and session information included in the user background information is background information regarding a history of browsing the shared web page by the first client. After the first client receives the sharing URL and acquires the combined web page, when the first client accesses the to-be-shared web page using the combined web page, because the sharing URL of the to-be-shared web page is a URL obtained by mapping by the reverse proxy server and is different from an original URL of the sharing website accessed by the first client, the first client and the shared website side consider this access as a new access. The first client sends the sharing URL of the to-be-shared web page to the reverse proxy server, and after the reverse proxy server forwards the sharing URL to the shared website, a sharing server establishes a session for this web page access, and sends an ID of the session to the first client. The first client locally records information about the access to the to-be-shared web page such as the cookie and the session ID, as the user background information. When subsequently accessing the to-be-shared web page using the sharing URL of the to-be-shared web page, the first client adds the cookie and the session ID into an access request. After receiving the access request, the shared website searches local session information according to the session ID carried in the access request, and with reference to the cookie in the access request, may return the first to-be-shared web page that includes the user background information.

That the first client accesses the sharing website using the reverse proxy server may be sending, by the first client, the access request that includes the sharing URL of the to-be-shared web page to the reverse proxy server, and modifying, by the reverse proxy server, the sharing URL of the to-be-shared page to the URL of the to-be-shared web page, and then sending the modified access request to the shared website, or after receiving the URL that is of the to-be-shared web page and is sent by the first client using the communication web page, sending, by the reverse proxy server, a page request to the shared website according to the URL of the to-be-shared web page, after receiving the page request, returning, by the shared website, a page response to the reverse proxy server, where the page response includes the session and the content of the first to-be-shared web page, and sending, by the reverse proxy server, the content of the first to-be-shared web page to the first client.

In this embodiment of the present disclosure, the first client acquires the first to-be-shared web page from the shared website using the reverse proxy server. For example, the JINGDONG Mall website acquires browsing history of a user on the JINGDONG Mall website using a cookie, provides a commodity recommendation according to the browsing history, and displays a commodity related to the browsing history of the user at the head, that is, the shared website generates, according to the cookie and the session, the to-be-shared web page that includes the user background information, and returns the to-be-shared web page to the first client. Because one website cannot acquire a browsing record of a user on another website, when one website includes information about another website, for example, the shared website also includes an advertisement of "BAIDU Promotion" or "GOOGLE Promotion", generally, this advertisement is unrelated to the shared website browsed by the user with a browsing history on the another website used. The to-be-shared web page returned by the shared website includes only user background information related to the shared website. The first client obtains, according to the returned to-be-shared web page and user background information that is related to the another website and is in a local cookie, the to-be-shared web page that includes user background information related to all websites.

Step 104: The first client sends the sharing URL to a second client such that the second client acquires a second to-be-shared web page according to the sharing URL, where the second to-be-shared web page does not include the user background information of the first client.

It should be noted that, in this embodiment of the present disclosure, the sharing URL of the first to-be-shared web page is the same as a sharing URL of the second to-be-shared web page, both of which are the sharing URL of the to-be-shared web page. However, because the first to-be-shared web page and the second to-be-shared web page include different user background information, pages displayed for the two web pages are different. The first to-be-shared web page includes the user background information of the first client, and the second to-be-shared web page does not include the user background information of the first client.

This step is to implement URL synchronization between the first client and the second client, and the URL synchronization makes preparation for DOM synchronization in the next step. Generally, a DOM includes references to a JAVA-JAVASCRIPT file, a CSS file, and a resource file such as a picture. Generally, a reference to a resource file is described using a relative path (a path relative to a URL). The second client can correctly acquire a resource file only by synchronizing a URL of the second client with the URL of the first client. The resource file is unrelated to user background information, and generally, acquiring the resource file does not need user background information. Therefore, the first client and the second client may separately download a resource file from the shared website according to the sharing URL. The second client in this embodiment of the present disclosure acts as a sharing receiver.

In this embodiment, the first client sends the sharing URL to the second client to maintain URL synchronization between the first client and the second client. After receiving the sharing URL, the second client uses the sharing URL to download the resource file from the sharing website using the reverse proxy server, and obtains the second to-be-shared web page. Because the resource file is unrelated to user background information, and user background information of the second client and the user background information of the first client are different, content of the second to-be-shared web page obtained by the second client does not include the user background information of the first client. In the URL synchronization, only pages that do not include user background information can be synchronized between the first client and the second client. Because user background information of the first client and that of the second client is different, after URL synchronization, content of to-be-shared web pages displayed on the first client and the second client may be different.

Step 105: The first client sends a DOM of the first client to the second client, where the DOM of the first client corresponds to the first to-be-shared web page such that the second client modifies a DOM of the second client according to the DOM of the first client, and inserts a modified DOM of the second client into the second to-be-shared web page to generate the first to-be-shared web page.

Content of a user screen displayed by a browser running in a client is mainly related to the following content: a DOM obtained after Hypertext Markup Language (HTML) parsing, a JAVAJAVASCRIPT file, a CSS file, and a resource file such as a picture. The DOM may be modified by JAVAJAVASCRIPT, and the CSS file and the resource file such as a picture cannot be modified by JAVAJAVASCRIPT. The DOM is "main content" displayed on a page. The resource file needs to be referenced by the DOM, and then can be loaded and displayed on a page by the browser. Therefore, to implement content sharing between two communication parties, DOM synchronization needs to be implemented.

In one manner, the first client may send an entire DOM of the first client to the second client, and the DOM of the first client corresponds to the first to-be-shared web page acquired by the first client. After receiving the DOM of the first client, the second client directly replaces the DOM of the second client with the DOM of the first client to implement DOM synchronization with the first client.

In another manner, the first client may send only a partial DOM related to the user background information of the first client to the second client. After receiving the partial DOM related to the user background information of the first client, the second client modifies the DOM of the second client such that the DOM of the second client is synchronized with the DOM of the first client. In a process of modifying the DOM of the second client, the second client may modify the relative path, in the DOM, for describing the reference to the resource file, and therefore after DOM synchronization between the two parties, the second client generates the first to-be-shared web page according to the DOM of the second client and a resource file downloaded from the shared website.

In the method in this embodiment, a first client sends a URL of a to-be-shared web page to a reverse proxy server using a communication web page such that the reverse proxy server maps the URL of the to-be-shared web page and a URL of the communication web page to a sharing URL, then the first client acquires the sharing URL, acquires, according to the sharing URL, a first to-be-shared web page that includes user background information of the first client, and sends the sharing URL to a second client to implement URL synchronization between the first client and the second client, after the URL synchronization between the first client and the second client, the first client sends a DOM of the first client to the second client such that the second client modifies a DOM of the second client according to the DOM of the first client to keep DOM synchronization between the first client and the second client, and after the DOM synchronization between the first client and the second client, information synchronization is implemented between two users. According to the method in this embodiment, information synchronization between two communication parties can be implemented even if user background information of the two communication parties is different.

On the basis of the foregoing Embodiment 1, before the first client sends the entire or partial DOM of the first client to the second client, the first client hides, according to a setting of a user, information of the user that needs to be kept secret. For example, a user A needs to hide a user name and a password for login, and when sending the DOM to the second client, the first client hides the user name and the password. In this way, a user B cannot view the user name and the password of the user A.

The method in Embodiment 1 resolves the JAVAJAVASCRIPT domain crossing problem, the URL synchronization problem, and the DOM acquisition and synchronization problem. After information synchronization is implemented between the sharing imitator and the sharing receiver, when a DOM changes or a user operation makes a shared web page change, information synchronization still can be implemented between the two communication parties. The foregoing synchronization between the two communication parties caused by a DOM change or a shared web page change due to the user operation is also referred to as event synchronization, where an event includes a DOM event and a user interface (UI) event. An event synchronization problem may be resolved in the following manner DOM event: JAVAJAVASCRIPT may modify the DOM such that page content of a web page dynamically changes. Because user background information needs to be kept secret, JAVAJAVASCRIPT contexts cannot be totally synchronized, and therefore dynamic effects generated by JAVAJAVASCRIPT cannot be automatically synchronized. Therefore, the first client needs to dynamically monitor the DOM, and when determining that the DOM of the first client has changed, the first client sends change information of the DOM of the first client to the second client such that the second client modifies the DOM of the second client according to the change information to keep the DOM of the second client synchronized with the DOM of the first client.

The first client may monitor the DOM event in the following two manners. In a first monitoring manner, the first client listens to the DOM event using an interface, calls a callback function when a DOM event occurs, and sends the change information of the DOM to the second client using the callback function. In this manner, once a DOM element changes, the browser automatically executes the callback function. In a second monitoring manner, the first client periodically compares current content of the DOM of the first client with previous content to determine whether the DOM of the first client has changed, and when the DOM of the first client has changed, sends change information to the second client. When receiving the change information of the DOM of the first client, the second client modifies the DOM of the second client according to the change information such that the DOM of the second client is kept synchronized with the DOM of the first client.

UI event: The UI event mainly has two purposes. The first is to trigger a JAVAJAVASCRIPT event such that page content of a web page changes, this event may be classified as a DOM event, and is processed in a manner of processing the DOM event. The second is to change the DOM of the first client by scrolling, mouse focus moving, keyboard input, and the like that are used for assistance in reading and input, this event needs an extra mechanism for synchronization. When detecting input information entered by a user using an input device, the first client sends the input information to the second client such that the second client keeps DOM synchronization with the first client according to the input information. The input device herein refers to an external input device such as a mouse and a keyboard, and the input information is a location of the mouse, an input focus of the keyboard, input content, and the like.

Figure 3:
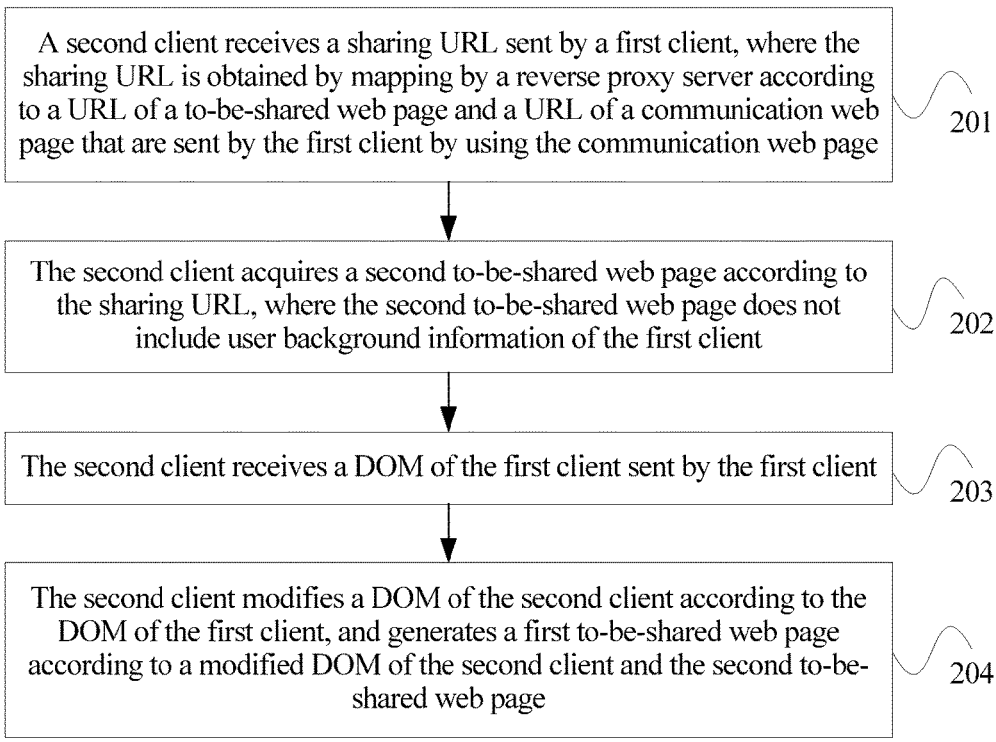
FIG. 3 is a flowchart of Embodiment 2 of an information sharing method according to the present disclosure.

FIG. 3 is a flowchart of Embodiment 2 of an information sharing method according to the present disclosure. As shown in FIG. 3, the method in this embodiment may include the following steps.

Step 201: A second client receives a sharing URL sent by a first client, where the sharing URL is obtained by mapping by a reverse proxy server according to a URL of a to-beshared web page and a URL of a communication web page, where the URL of the to-be-shared web page is sent by the first client using the communication web page.

The reverse proxy server maps a communication website on which the communication web page is located and a shared website on which the to-be-shared web page is located to a same virtual website, which resolves a domain crossing problem of JAVAJAVASCRIPT. The reverse proxy server sends the sharing URL to the first client, where the sharing URL includes a sharing URL of the to-be-shared web page and a sharing URL of the communication web page. The first client can access content of the to-be-shared web page using the sharing URL. After acquiring the sharing URL, the first client sends the sharing URL to the second client such that URLs of the first client and of the second client are synchronized.

Step 202: The second client acquires a second to-be-shared web page according to the sharing URL, where the second to-be-shared web page does not include user background information of the first client.

After receiving the sharing URL, the second client acquires the second to-be-shared web page using the reverse proxy server according to the sharing URL. In an embodiment, the second client sends a first page request to the reverse proxy server, where the first page request includes the sharing URL of the to-be-shared web page such that the reverse proxy server modifies the sharing URL of the to-be-shared web page to the URL of the to-be-shared web page to generate a second page request, and sends the second page request to the shared website. The second page request includes the URL of the to-be-shared web page. The shared website returns a second page response to the reverse proxy server according to the second page request, where the second page response includes content of the second to-be-shared web page. After receiving the second page response, the reverse proxy server modifies the URL of the to-be-shared web page and in the second page response to the sharing URL of the to-be-shared web page, and returns a first page response to the second client.

The second client receives the first page response, where the first page response includes the content of the second to-be-shared web page. Because user background information of the first client and that of the second client is different, after URL synchronization, content of to-be-shared web pages displayed on the first client and the second client is different. The first client displays a first to-be-shared web page to a user, where the first to-be-shared web page includes the user background information of the first client. The second client displays the second to-be-shared web page to a user, where the second to-be-shared web page does not include the user background information of the first client.

Step 203: The second client receives a DOM of the first client sent by the first client.

After the first client acquires the first to-be-shared web page, the first client sends the DOM of the first client to the second client, where the DOM of the first client corresponds to the first to-be-shared web page.

Step 204: The second client modifies a DOM of the second client according to the DOM of the first client, and generates a first to-be-shared web page according to a modified DOM of the second client and the second to-be-shared web page.

The second client modifies the DOM of the second client such that the DOM of the second client is synchronized with the DOM of the first client. After DOM synchronization between the two parties, information synchronization is implemented between the first client and the second client, and the two parties can view a same page. When modifying the DOM of the second client, the second client modifies a resource file reference in the DOM. Therefore, after completing DOM modification, the second client further needs to re-download a resource file from the shared website according to a resource file reference relationship. The resource file downloaded at this time may be different from a resource file downloaded when the second to-be-shared web page is acquired. After the second client acquires the DOM and the resource file, a browser generates, according to the DOM of the second client and the resource file, the first to-be-shared web page that includes the user background information of the first client.

In this embodiment, a second client receives a sharing URL sent by a first client, and acquires a second to-be-shared web page according to the sharing URL to implement URL synchronization between the two parties, where the second to-be-shared web page is a to-be-shared web page that does not include user background information of the first client. After the URL synchronization between the two parties, the second client receives a DOM of the first client sent by the first client, where the DOM of the first client corresponds to a first to-be-shared web page, and the first to-be-shared web page includes the user background information of the first client. The second client modifies a DOM of the second client according to the DOM of the first client to keep the DOM of the second client synchronized with the DOM of the first client. After DOM synchronization between two communication parties, information sharing is implemented between the two communication parties.

After the second client implements information synchronization with the first client, when the first client determines that the DOM of the first client has changed, the first client sends change information of the DOM to the second client. The second client receives the change information that is of the DOM of the first client and is sent by the first client, and modifies the DOM of the second client according to the change information to keep the DOM of the second client synchronized with the DOM of the first client.

After the second client implements information synchronization with the first client, when a user enters input information using an input device, the DOM of the first client is also caused to change, and information of the two parties are not synchronized. Therefore, when detecting the input information entered by the user using the input device, the first client sends the input information to the second client. After receiving the input information, the second client modifies the DOM of the second client according to the input information to keep the DOM of the second client synchronized with the DOM of the first client.

Figure 4:
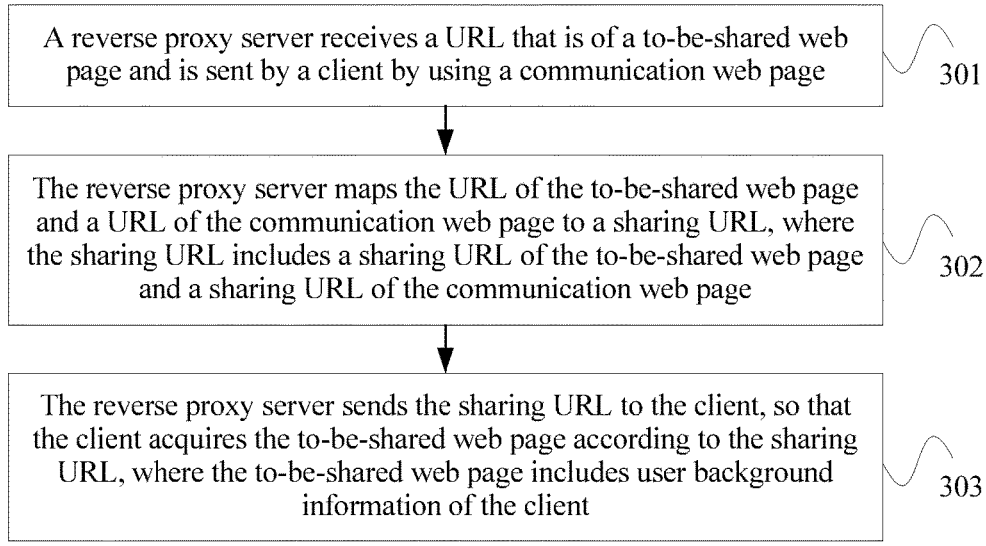
FIG. 4 is a flowchart of Embodiment 3 of an information sharing method according to the present disclosure.

FIG. 4 is a flowchart of Embodiment 3 of an information sharing method according to the present disclosure. As shown in FIG. 4, the method in this embodiment may include the following steps Step 301: A reverse proxy server receives a URL that is of a to-be-shared web page and is sent by a client using a communication web page.

Step 302: The reverse proxy server maps the URL of the to-be-shared web page and a URL of the communication web page to a sharing URL, where the sharing URL includes a sharing URL of the to-be-shared web page and a sharing URL of the communication web page.

Step 303: The reverse proxy server sends the sharing URL to the client such that the client acquires the to-be-shared web page according to the sharing URL, where the to-be-shared web page includes user background information of the client.

A purpose of the reverse proxy server is to resolve a domain crossing problem of JAVAJAVASCRIPT by mapping the communication web page and the to-be-shared web page to a virtual website. To implement the function, a web server such as tomcat may be disposed on a same machine of an existing reverse proxy server. The web server includes servlet or another web service that is compiled in an underlying language (for example, JAVA) that can be used to read and write a system file. The web service provides a page, and is used to receive the URL that is of the to-be-shared web page and is sent by the client. After the web service receives the URL of the to-be-shared web page, a configuration of the reverse proxy server is operated using the underlying language to map the URL of the to-be-shared web page to a sub-URL in the reverse proxy server. The web service guides a client browser (or iframe in a browser) to jump to the sub-URL in the reverse proxy server, where the sub-URL herein is the sharing URL of the to-be-shared web page or the sharing URL of the communication web page that is in the sharing URL.

In one implementation manner, the user background information of the client includes a cookie and a session that correspond to the to-be-shared web page. When the client acquires the to-be-shared web page according to the sharing URL, the reverse proxy server is further configured to execute the following operations: receiving, by the reverse proxy server, a request sent by the client, where the request includes the cookie, and the cookie includes an ID of the session, acquiring, by the reverse proxy server, the to-be-shared web page from a shared website according to the request, and sending the to-be-shared web page to the client.

In an embodiment, the receiving, by the reverse proxy server, a request sent by the client includes receiving, by the reverse proxy server, a first page request sent by the client, where the first page request includes the sharing URL of the to-be-shared web page and the cookie, and the cookie includes the session ID. The acquiring, by the reverse proxy server, the to-be-shared web page from a shared website according to the request, and sending the to-be-shared web page to the client includes modifying, by the reverse proxy server, the sharing URL of the to-be-shared web page and in the first page request to the URL of the to-be-shared web page to generate a second page request, and sending the second page request to the shared website, receiving, by the reverse proxy server, a second page response sent by the shared website, where the second page response includes the URL of the to-be-shared web page and content of the to-be-shared web page, and the content of the to-be-shared web page is determined by the shared website according to the user background information, and modifying, by the reverse proxy server, the URL of the to-be-shared web page and in the second page response to the sharing URL of the to-be-shared web page to generate a first page response, and sending the first page response to the client, where the first page response includes the content of the to-be-shared web page. After receiving the first page response, the client generates the to-be-shared web page according to the content of the to-be-shared web page, where the to-be-shared web page includes the user background information of the client.

In an embodiment, after receiving the URL that is of the to-be-shared web page and is sent by the client using the communication web page, the reverse proxy server may further send a page request to the shared website according to the URL of the to-be-shared web page. After receiving the page request, the shared website returns a page response to the reverse proxy server, where the page response includes the content of the to-be-shared web page. The reverse proxy server sends the content of the to-be-shared web page to the client.

In another implementation manner, the user background information includes a cookie, a session, and user permission information that correspond to the to-be-shared web page. When the client acquires the to-be-shared web page according to the sharing URL, the reverse proxy server is further configured to execute the following operations: receiving, by the reverse proxy server, a first page request sent by the client, where the first page request includes the sharing URL of the to-be-shared web page, the cookie, and the user permission information, and the cookie includes an ID of the session, modifying, by the reverse proxy server, the sharing URL of the to-be-shared web page and in the first page request to the URL of the to-be-shared web page to generate a second page request, and sending the second page request to a shared website, receiving, by the reverse proxy server, a second page response sent by the shared website, where the second page response includes the URL of the to-be-shared web page and content of the to-be-shared web page, and the content of the to-be-shared web page is determined by the shared website according to the user background information, modifying, by the reverse proxy server, the URL of the to-be-shared web page and in the second page response to the sharing URL of the to-be-shared web page to generate a first page response, and sending the first page response to the client, where the first page response includes the content of the to-be-shared web page.

When the client acquires the to-be-shared web page, the reverse proxy server is further configured to execute the following operations: when the to-be-shared web page passes the reverse proxy server, inserting, by the reverse proxy server, the communication web page into the to-be-shared web page in a plug-in manner to generate a combined web page, where the communication web page and the to-be-shared web page are displayed on the combined web page, and a URL of the combined web page is the sharing URL, and sending, by the reverse proxy server, the combined web page to the client such that the client acquires the to-be-shared web page according to the combined web page.

Figure 5A:
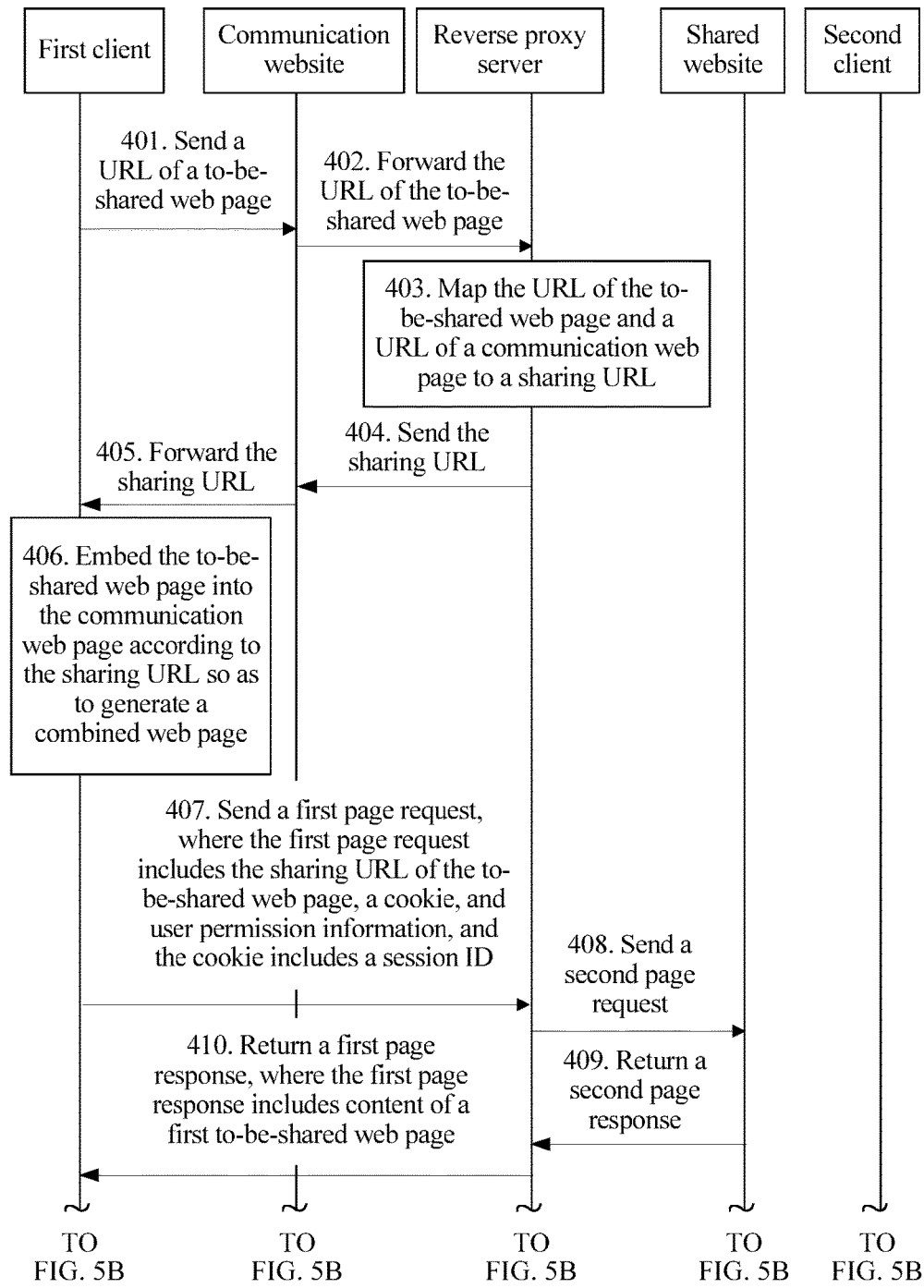
FIG. 5A and FIG. 5B are a signaling flowchart of Embodiment 4 of an information sharing method according to the present disclosure.
Figure 5B:
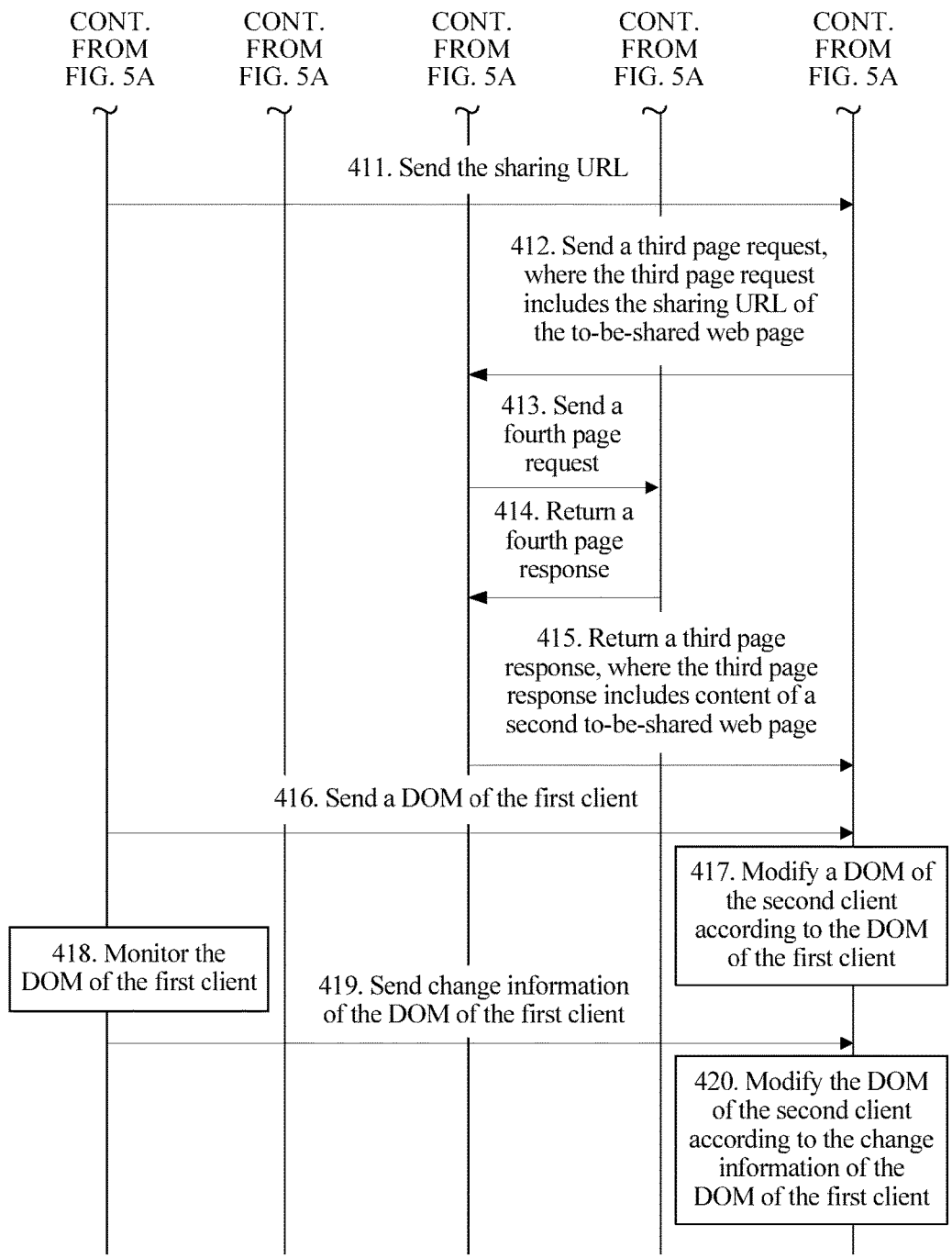

FIG. 5A and FIG. 5B are a signaling flowchart of Embodiment 4 of an information sharing method according to the present disclosure. As shown in FIG. 5A and FIG. 5B, the method in this embodiment may include the following steps.

Step 401: A first client sends a URL of a to-be-shared web page to a communication website.

Step 402: The communication website forwards the URL of the to-be-shared web page to a reverse proxy server.

Step 403: The reverse proxy server maps the URL of the to-be-shared web page and a URL of a communication web page to a sharing URL.

Step 404: The reverse proxy server sends the sharing URL to the communication website.

Step 405: The communication website forwards the sharing URL to the first client.

Step 406: The first client embeds the to-be-shared web page into the communication web page according to the sharing URL to generate a combined web page.

Step 407: The first client sends a first page request to the reverse proxy server, where the first page request includes the sharing URL of the to-be-shared web page, a cookie, and user permission information, and the cookie includes a session ID.

When the user permission information includes a user name and a password, a user needs to first open the to-be-shared web page using the combined web page, and then acquire a first to-be-shared web page, after entering the user name and the password on the to-be-shared web page to log in to a shared website.

Step 408: The reverse proxy server generates a second page request according to the first page request and sends the second page request to a shared website.

In an embodiment, the reverse proxy server modifies the sharing URL of the to-be-shared web page to the URL of the to-be-shared web page to generate the second page request.

Step 409: The shared website returns a second page response to the reverse proxy server according to the second page request.

In an embodiment, the shared website determines content of the first to-be-shared web page according to user background information in the second page request, and adds the content of the first to-be-shared web page into the second page response.

Step 410: The reverse proxy server returns a first page response to the first client according to the second page response, where the first page response includes content of the first to-be-shared web page.

The first client receives the first page response, and generates the first to-be-shared web page according to the content of the first to-be-shared web page.

Step 411: The first client sends the sharing URL to a second client.

Step 412: The second client sends a third page request to the reverse proxy server, where the third page request includes the sharing URL of the to-be-shared web page.

Step 413: The reverse proxy server generates a fourth page request according to the third page request and sends the fourth page request to the shared website.

In an embodiment, the reverse proxy server modifies the sharing URL of the to-be-shared web page and in the third page request to the URL of the to-be-shared web page.

Step 414: The shared website returns a fourth page response to the reverse proxy server according to the fourth page request.

The fourth page response includes content of a second to-be-shared web page, where the content of the second to-be-shared web page does not include user background information of the first client.

Step 415: The reverse proxy server returns a third page response to the second client according to the fourth page response, where the third page response includes content of a second to-be-shared web page.

The second client receives the third page response, and generates the second to-be-shared web page according to the content of the second to-be-shared web page.

Step 416: The first client sends a DOM of the first client to the second client.

The first client may send an entire DOM of the first client to the second client, or may send only a DOM related to the user background information of the first client to the second client.

In an embodiment, before sending the DOM of the first client to the second client, the first client may further hide, according to a setting, information that needs to be kept secret.

Step 417: The second client modifies a DOM of the second client according to the DOM of the first client.

Step 418: The first client monitors the DOM of the first client.

Step 419: When detecting that the DOM of the first client has changed, the first client sends change information of the DOM of the first client to the second client.

Step 420: The second client modifies the DOM of the second client according to the change information of the DOM of the first client.

Figure 6:
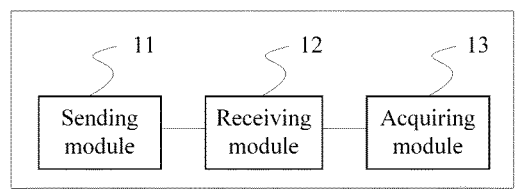
FIG. 6 is a schematic structural diagram of a first client according to an embodiment of the present disclosure.

FIG. 6 is a schematic structural diagram of a first client according to an embodiment of the present disclosure. As shown in FIG. 6, the first client in this embodiment may include a sending module 11, a receiving module 12, and an acquiring module 13.

The sending module 11 is configured to send a URL of a to-be-shared web page to a reverse proxy server using a communication web page such that the reverse proxy server maps the URL of the to-be-shared web page and a URL of the communication web page to a sharing URL, where the sharing URL includes a sharing URL of the to-be-shared web page and a sharing URL of the communication web page.

The receiving module 12 is configured to receive the sharing URL sent by the reverse proxy server.

The acquiring module 13 is configured to acquire a first to-be-shared web page according to the sharing URL, where the first to-be-shared web page includes user background information of the first client.

The sending module 11 is further configured to send the sharing URL to a second client such that the second client acquires a second to-be-shared web page according to the sharing URL, where the second to-be-shared web page does not include the user background information of the first client.

The sending module 11 is further configured to send a document object model DOM of the first client to the second client, where the DOM of the first client corresponds to the first to-be-shared web page such that the second client modifies a DOM of the second client according to the DOM of the first client, and generates the first to-be-shared web page according to a modified DOM of the second client and the second to-be-shared web page.

The apparatus in this embodiment may be configured to execute technical solutions in the method embodiments shown in FIG. 1, FIG. 5A, and FIG. 5B, implementation principles and technical effects thereof are similar, and details are not described herein again.

Figure 7:
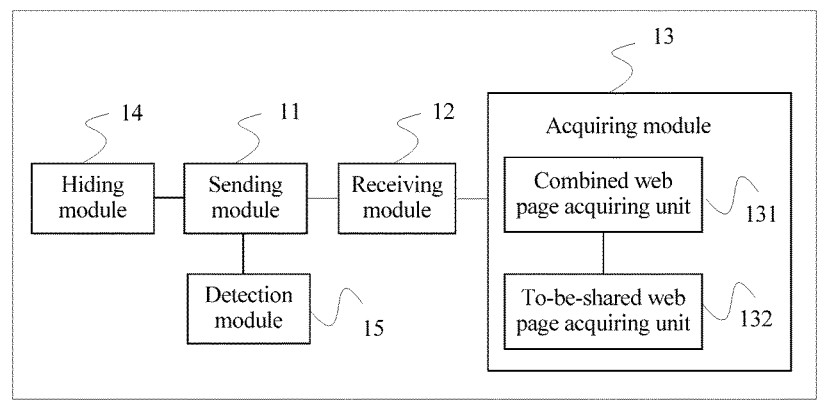
FIG. 7 is a schematic structural diagram of another first client according to an embodiment of the present disclosure.

FIG. 7 is a schematic structural diagram of another first client according to an embodiment of the present disclosure. The first client in this embodiment is based on the first client shown in FIG. 6, and the acquiring module 13 includes a combined web page acquiring unit 131 and a to-be-shared web page acquiring unit 132. The combined web page acquiring unit 131 is configured to acquire a combined web page according to the sharing URL, where the communication web page and the to-be-shared web page are displayed on the combined web page, and a URL of the combined web page is the sharing URL. The to-be-shared web page acquiring unit 132 is configured to acquire the first to-be-shared web page using the combined web page and the user background information of the first client.

The combined web page acquiring unit 131 is configured to embed the to-be-shared web page into the communication web page according to the sharing URL of the communication web page and the sharing URL of the to-be-shared web page that are in the sharing URL to form the combined web page, or receive, using the sharing URL, the combined web page sent by the reverse proxy server, where the combined web page is generated by the reverse proxy server by inserting the communication web page into the to-be-shared web page in a plug-in manner.

In one implementation manner, the user background information includes a cookie and a session that correspond to the to-be-shared web page, and the to-be-shared web page acquiring unit 132 is configured to send a request to the reverse proxy server using the combined web page to acquire the first to-be-shared web page, where the request includes the cookie, and the cookie includes an ID of the session, and receive the first to-be-shared web page from the reverse proxy server, where the first to-be-shared web page is acquired from a shared website by the reverse proxy server according to the request.

When sending the request to the reverse proxy server to acquire the first to-be-shared web page, the to-be-shared web page acquiring unit 132 is configured to send a first page request to the reverse proxy server, where the first page request includes the sharing URL of the to-be-shared web page and the cookie, and the cookie includes the session ID such that the reverse proxy server modifies the sharing URL of the to-be-shared web page to the URL of the to-be-shared web page to generate a second page request, and sends the second page request to the shared website. When receiving the first to-be-shared web page from the reverse proxy server, the to-be-shared web page acquiring unit 132 is configured to receive a first page response, where the first page response includes content of the first to-be-shared web page, and the first page response is sent by the reverse proxy server to the first client according to a second page response returned by the shared website with respect to the second page request.

In another implementation manner, the user background information includes a cookie, a session, and user permission information that correspond to the to-be-shared web page, and the to-be-shared web page acquiring unit 132 is configured to send a first page request to the reverse proxy server, where the first page request includes the sharing URL of the to-be-shared web page, the cookie, and the user permission information, and the cookie includes an ID of the session such that the reverse proxy server modifies the sharing URL of the to-be-shared web page to the URL of the to-be-shared web page to generate a second page request, and sends the second page request to a shared website, and receive a first page response, where the first page response includes content of the first to-be-shared web page, the content of the first to-be-shared web page is determined by the shared website according to the user background information, and the first page response is sent by the reverse proxy server to the first client according to a second page response returned by the shared website with respect to the second page request.

In an embodiment, the first client further includes a hiding module 14 configured to, before the sending module 11 sends the DOM of the first client to the second client, hide, according to a setting, information that needs to be kept secret.

Further, in this embodiment, the first client further includes a detection module 15 configured to determine whether the DOM of the first client has changed. Correspondingly, the sending module 11 is further configured to, when the detection module 15 determines that the DOM of the first client has changed, send change information of the DOM of the first client to the second client such that the second client modifies the DOM of the second client according to the change information.

The detection module 15 is further configured to detect input information entered using an input device. Correspondingly, the sending module 11 is further configured to, when the detection module 15 detects the input information entered using the input device, send the input information to the second client such that the second client modifies the DOM of the second client according to the input information.

The apparatus in this embodiment may be configured to execute technical solutions in the method embodiments shown in FIG. 1 and FIG. 2, implementation principles and technical effects thereof are similar, and details are not described herein again.

Figure 8:
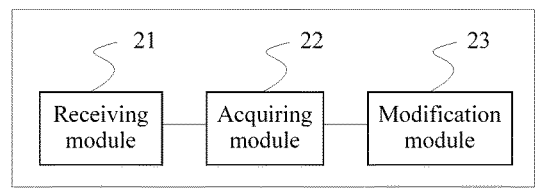
FIG. 8 is a schematic structural diagram of a second client according to an embodiment of the present disclosure.

FIG. 8 is a schematic structural diagram of a second client according to an embodiment of the present disclosure. As shown in FIG. 8, the second client provided in this embodiment includes a receiving module 21, an acquiring module 22, and a modification module 23.

The receiving module 21 is configured to receive a sharing URL sent by a first client, where the sharing URL is obtained by mapping by a reverse proxy server according to a URL of a to-be-shared web page and a URL of a communication web page, where the URL of the to-be-shared web page is sent by the first client using the communication web page, and the sharing URL includes a sharing URL of the to-be-shared web page and a sharing URL of the communication web page.

The acquiring module 22 is configured to acquire a second to-be-shared web page according to the sharing URL, where the second to-be-shared web page does not include user background information of the first client.

The receiving module 21 is further configured to receive a document object model DOM of the first client sent by the first client, where the DOM of the first client corresponds to a first to-be-shared web page, and the first to-be-shared web page includes the user background information of the first client.

The modification module 23 is configured to modify a DOM of the second client according to the DOM of the first client, and generate the first to-be-shared web page according to a modified DOM of the second client and the second to-be-shared web page.

The acquiring module 22 is configured to send a first page request to the reverse proxy server, where the first page request includes the sharing URL of the to-be-shared web page such that the reverse proxy server modifies the sharing URL of the to-be-shared web page to the URL of the to-be-shared web page to generate a second page request, and sends the second page request to a shared website, and receive a first page response, where the first page response includes content of the second to-be-shared web page, and the first page response is sent by the reverse proxy server to the second client according to a second page response returned by the shared website with respect to the second page request.

When the DOM of the first client changes, the receiving module 21 is further configured to receive change information that is of the DOM of the first client and is sent by the first client, where the change information is sent by the first client to the second client when it is detected that the DOM of the first client has changed. Correspondingly, the modification module 23 is further configured to modify the DOM of the second client according to the change information, or, the receiving module 21 is further configured to receive input information sent by the first client, where the input information is sent by the first client to the second client when it is detected that a user has entered the input information using an input device. The modification module 23 is further configured to modify the DOM of the second client according to the input information.

The second client in this embodiment may be configured to execute technical solutions in the method embodiments shown in FIG. 3, FIG. 5A, and FIG. 5B, implementation principles and technical effects thereof are similar, and details are not described herein again.

Figure 9:
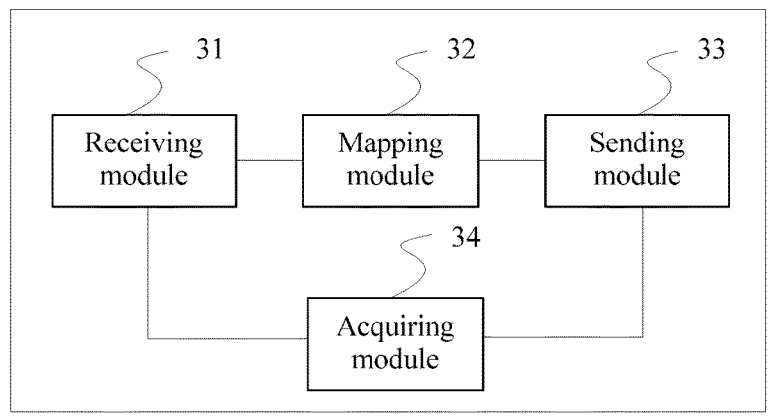
FIG. 9 is a schematic structural diagram of a reverse proxy server according to an embodiment of the present disclosure.

FIG. 9 is a schematic structural diagram of a reverse proxy server according to an embodiment of the present disclosure. As shown in FIG. 9, the reverse proxy server in this embodiment includes a receiving module 31, a mapping module 32, and a sending module 33.

The receiving module 31 is configured to receive a URL that is of a to-be-shared web page and is sent by a client using a communication web page.

The mapping module 32 is configured to map the URL of the to-be-shared web page and a URL of the communication web page to a sharing URL, where the sharing URL includes a sharing URL of the to-be-shared web page and a sharing URL of the communication web page.

The sending module 33 is configured to send the sharing URL to the client such that the client acquires the to-be-shared web page according to the sharing URL, where the to-be-shared web page includes user background information of the client.

In one implementation manner, the user background information includes a cookie and a session that correspond to the to-be-shared web page, and the reverse proxy server further includes an acquiring module 34. The receiving module 31 is further configured to receive a request sent by the client, where the request includes the cookie, and the cookie includes an ID of the session. The acquiring module 34 is configured to acquire the to-be-shared web page from a shared website according to the request, and send the to-be-shared web page to the client.

The receiving module 31 is configured to receive a first page request sent by the client, where the first page request includes the sharing URL of the to-be-shared web page and the cookie, and the cookie includes the session ID. The acquiring module 34 is configured to modify the sharing URL of the to-be-shared web page and in the first page request to the URL of the to-be-shared web page to generate a second page request, and send the second page request to the shared website, receive a second page response sent by the shared website, where the second page response includes the URL of the to-be-shared web page and content of the to-be-shared web page, and modify the URL of the to-be-shared web page and in the second page response to the sharing URL of the to-be-shared web page to generate a first page response, and send the first page response to the client, where the first page response includes the content of the to-be-shared web page.

In another implementation manner, the user background information includes a cookie, a session, and user permission information that correspond to the to-be-shared web page, and the reverse proxy server further includes an acquiring module 34. The receiving module 31 is further configured to receive a first page request sent by the client, where the first page request includes the sharing URL of the to-be-shared web page, the cookie, and the user permission information, and the cookie includes an ID of the session. The acquiring module 34 is configured to modify the sharing URL of the to-be-shared web page and in the first page request to the URL of the to-be-shared web page to generate a second page request, and send the second page request to a shared website. The receiving module 31 is further configured to receive a second page response sent by the shared website, where the second page response includes the URL of the to-be-shared web page and content of the to-be-shared web page, and the content of the to-be-shared web page is determined by the shared website according to the user background information. The acquiring module 34 is further configured to modify the URL of the to-be-shared web page and in the second page response to the sharing URL of the to-be-shared web page to generate a first page response, where the first page response includes the content of the to-be-shared web page. The sending module 33 is further configured to send the first page response to the client.

The reverse proxy server in this embodiment may be configured to execute technical solutions in the method embodiments shown in FIG. 4, FIG. 5A, and FIG. 5B, implementation principles and technical effects thereof are similar, and details are not described herein again.

Figure 10:
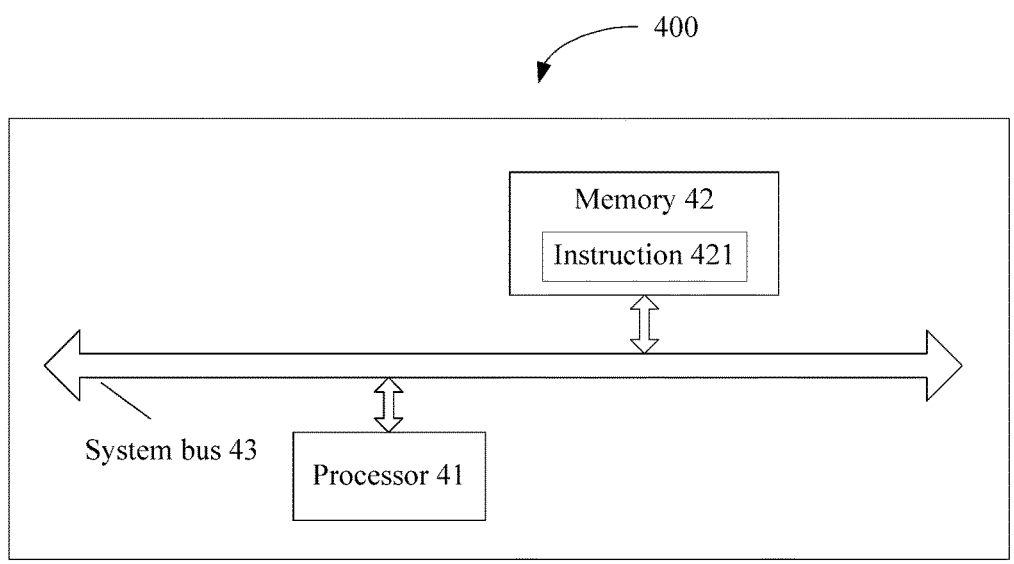
FIG. 10 is a schematic structural diagram of still another first client according to an embodiment of the present disclosure.

FIG. 10 is a schematic structural diagram of still another first client according to an embodiment of the present disclosure. As shown in FIG. 10, a first client 400 provided in this embodiment includes a processor 41, a memory 42, and a system bus 43. The processor 41 and the memory 42 are connected using the system bus 43 and implement communication with each other using the system bus 43. The memory 42 is configured to store a computer executable instruction 421. The processor 41 is configured to run the computer executable instruction 421 to execute the following operations: sending a URL of a to-be-shared web page to a reverse proxy server using a communication web page such that the reverse proxy server maps the URL of the to-be-shared web page and a URL of the communication web page to a sharing URL, where the sharing URL includes a sharing URL of the to-be-shared web page and a sharing URL of the communication web page, receiving the sharing URL sent by the reverse proxy server, acquiring a first to-be-shared web page according to the sharing URL, where the first to-be-shared web page includes user background information of the first client, sending the sharing URL to a second client such that the second client acquires a second to-be-shared web page according to the sharing URL, where the second to-be-shared web page does not include the user background information of the first client, and sending a document object model DOM of the first client to the second client, where the DOM of the first client corresponds to the first to-be-shared web page such that the second client modifies a DOM of the second client according to the DOM of the first client, and generates the first to-be-shared web page according to a modified DOM of the second client and the second to-be-shared web page.

That the processor 41 acquires the first to-be-shared web page according to the sharing URL is acquiring a combined web page according to the sharing URL, where the communication web page and the to-be-shared web page are displayed on the combined web page, and a URL of the combined web page is the sharing URL, and acquiring the first to-be-shared web page using the combined web page and the user background information of the first client.

That the processor 41 acquires the combined web page according to the sharing URL is embedding the to-be-shared web page into the communication web page according to the sharing URL of the communication web page and the sharing URL of the to-be-shared web page that are in the sharing URL to form the combined web page, or receiving, using the sharing URL, the combined web page sent by the reverse proxy server, where the combined web page is generated by the reverse proxy server by inserting the communication web page into the to-be-shared web page in a plug-in manner.

In one implementation manner, the user background information includes a cookie and a session that correspond to the to-be-shared web page, and that the processor 41 acquires the first to-be-shared web page using the combined web page and the user background information of the first client is sending a request to the reverse proxy server using the combined web page to acquire the first to-be-shared web page, where the request includes the cookie, and the cookie includes an ID of the session, and receiving the first to-be-shared web page from the reverse proxy server, where the first to-be-shared web page is acquired from a shared website by the reverse proxy server according to the request.

That the processor 41 sends the request to the reverse proxy server using the combined web page to acquire the first to-be-shared web page is sending a first page request to the reverse proxy server, where the first page request includes the sharing URL of the to-be-shared web page and the cookie, and the cookie includes the session ID such that the reverse proxy server modifies the sharing URL of the to-be-shared web page to the URL of the to-be-shared web page to generate a second page request, and sends the second page request to the shared website.

That the processor 41 receives the first to-be-shared web page from the reverse proxy server is receiving a first page response, where the first page response includes content of the first to-be-shared web page, and the first page response is sent by the reverse proxy server to the first client according to a second page response returned by the shared website with respect to the second page request.

In another implementation manner, the user background information includes a cookie, a session, and user permission information that correspond to the to-be-shared web page, and that the processor 41 acquires the first to-be-shared web page using the combined web page and the user background information of the first client is sending a first page request to the reverse proxy server, where the first page request includes the sharing URL of the to-be-shared web page, the cookie, and the user permission information, and the cookie includes an ID of the session such that the reverse proxy server modifies the sharing URL of the to-be-shared web page to the URL of the to-be-shared web page to generate a second page request, and sends the second page request to a shared website, and then, receiving a first page response, where the first page response includes content of the first to-be-shared web page, the content of the first to-be-shared web page is determined by the shared website according to the user background information, and the first page response is sent by the reverse proxy server to the first client according to a second page response returned by the shared website with respect to the second page request.

Before the processor 41 sends the DOM of the first client to the second client, the processor 41 is further configured to hide, according to a setting, information that needs to be kept secret.

The processor 41 is further configured to detect whether the DOM of the first client has changed, and when determining that the DOM of the first client has changed, the processor 41 sends change information of the DOM of the first client to the second client such that the second client modifies the DOM of the second client according to the change information.

The processor 41 is further configured to detect input information entered by a user using an input device, and when detecting the input information entered using the input device, send the input information to the second client such that the second client modifies the DOM of the second client according to the input information.

The first client in this embodiment may be configured to execute technical solutions in the method embodiments shown in FIG. 1, FIG. 5A, and FIG. 5B, implementation principles and technical effects thereof are similar, and details are not described herein again.

Figure 11:
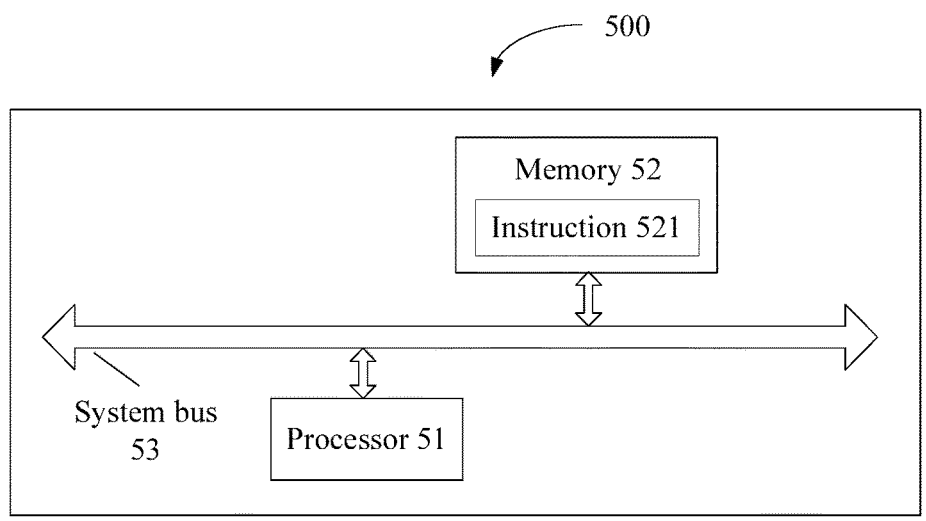
FIG. 11 is a schematic structural diagram of another second client according to an embodiment of the present disclosure.

FIG. 11 is a schematic structural diagram of another second client according to an embodiment of the present disclosure. As shown in FIG. 11, a second client 500 provided in this embodiment includes a processor 51, a memory 52, and a system bus 53. The processor 51 and the memory 52 are connected using the system bus 53 and implement communication with each other using the system bus 53. The memory 52 is configured to store a computer executable instruction 521. The processor 51 is configured to run the computer executable instruction 521 to execute the following operations: receiving a sharing URL sent by a first client, where the sharing URL is obtained by mapping by a reverse proxy server according to a URL of a to-be-shared web page and a URL of a communication web page, where the URL of the to-be-shared web page is sent by the first client using the communication web page, and the sharing URL includes a sharing URL of the to-be-shared web page and a sharing URL of the communication web page, acquiring a second to-be-shared web page according to the sharing URL, where the second to-be-shared web page does not include user background information of the first client, receiving a document object model DOM of the first client sent by the first client, where the DOM of the first client corresponds to a first to-be-shared web page, and the first to-be-shared web page includes the user background information of the first client, and modifying a DOM of the second client according to the DOM of the first client, and generating the first to-be-shared web page according to a modified DOM of the second client and the second to-be-shared web page.

That the processor 51 acquires the second to-be-shared web page according to the sharing URL is sending a first page request to the reverse proxy server, where the first page request includes the sharing URL of the to-be-shared web page such that the reverse proxy server modifies the sharing URL of the to-be-shared web page to the URL of the to-be-shared web page to generate a second page request, and sends the second page request to a shared website, and receiving a first page response, where the first page response includes content of the second to-be-shared web page, and the first page response is sent by the reverse proxy server to the second client according to a second page response returned by the shared website with respect to the second page request.

The processor 51 is further configured to receive change information that is of the DOM of the first client and is sent by the first client, and modify the DOM of the second client according to the change information, where the change information is sent by the first client to the second client when it is detected that the DOM of the first client has changed, or receive input information sent by the first client, and modify the DOM of the second client according to the input information, where the input information is sent by the first client to the second client when it is detected that a user has entered the input information using an input device.

The second client in this embodiment may be configured to execute technical solutions in the method embodiments shown in FIG. 3, FIG. 5A, and FIG. 5B, implementation principles and technical effects thereof are similar, and details are not described herein again.

Figure 12:
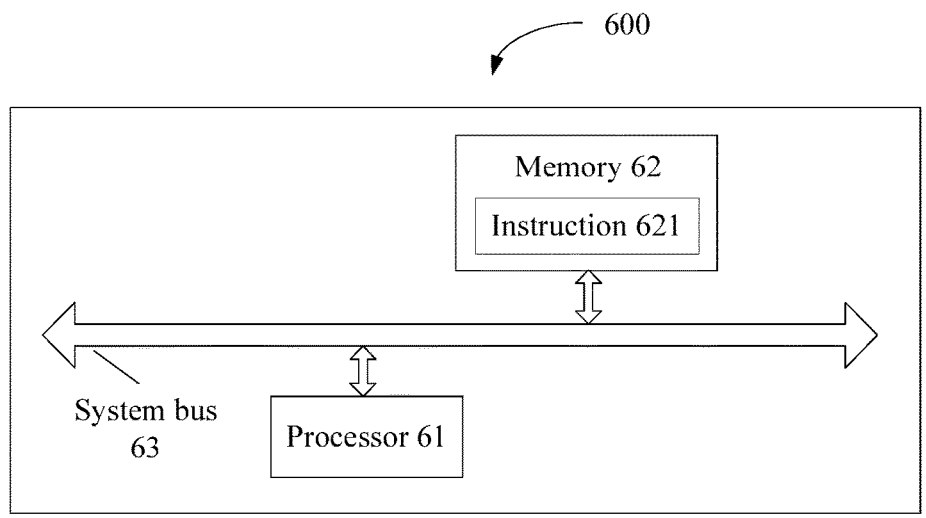
FIG. 12 is a schematic structural diagram of another reverse proxy server according to an embodiment of the present disclosure.

FIG. 12 is a schematic structural diagram of another reverse proxy server according to an embodiment of the present disclosure. As shown in FIG. 12, a reverse proxy server 600 provided in this embodiment includes a processor 61, a memory 62, and a system bus 63. The processor 61 and the memory 62 are connected using the system bus 63 and implement communication with each other using the system bus 63. The memory 62 is configured to store a computer executable instruction 621. The processor 61 is configured to run the computer executable instruction 621 to execute the following operations receiving a URL that is of a to-be-shared web page and is sent by a client using a communication web page, mapping the URL of the to-be-shared web page and a URL of the communication web page to a sharing URL, where the sharing URL includes a sharing URL of the to-be-shared web page and a sharing URL of the communication web page, and sending the sharing URL to the client such that the client acquires the to-be-shared web page according to the sharing URL, where the to-be-shared web page includes user background information of the client.

When the user background information includes a cookie and a session that correspond to the to-be-shared web page, the processor 61 is further configured to receive a request sent by the client, where the request includes the cookie, and the cookie includes an ID of the session, and acquire the to-be-shared web page from a shared website according to the request, and send the to-be-shared web page to the client.

That the processor 61 receives the request sent by the client is receiving a first page request sent by the client, where the first page request includes the sharing URL of the to-be-shared web page and the cookie, and the cookie includes the session ID. That the processor 61 acquires the to-be-shared web page from the shared website according to the request, and sends the to-be-shared web page to the client is modifying the sharing URL of the to-be-shared web page and in the first page request to the URL of the to-be-shared web page to generate a second page request, and sending the second page request to the shared website, receiving a second page response sent by the shared website, where the second page response includes the URL of the to-be-shared web page and content of the to-be-shared web page, and modifying the URL of the to-be-shared web page and in the second page response to the sharing URL of the to-be-shared web page to generate a first page response, and sending the first page response to the client, where the first page response includes the content of the to-be-shared web page.

When the user background information includes a cookie, a session, and user permission information that correspond to the to-be-shared web page, the processor 61 is further configured to receive a first page request sent by the client, where the first page request includes the sharing URL of the to-be-shared web page, the cookie, and the user permission information, and the cookie includes an ID of the session, modify the sharing URL of the to-be-shared web page and in the first page request to the URL of the to-be-shared web page to generate a second page request, and send the second page request to a shared website, receive a second page response sent by the shared website, where the second page response includes the URL of the to-be-shared web page and content of the to-be-shared web page, and the content of the to-be-shared web page is determined by the shared website according to the user background information, and modify the URL of the to-be-shared web page and in the second page response to the sharing URL of the to-be-shared web page to generate a first page response, and send the first page response to the client, where the first page response includes the content of the to-be-shared web page.

The reverse proxy server in this embodiment may be configured to execute technical solutions in the method embodiments shown in FIG. 4, FIG. 5A, and FIG. 5B, implementation principles and technical effects thereof are similar, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

What is claimed is:

1. An information sharing method, comprising:
sending, by a first client, a uniform resource locator (URL) of a to-be-shared web page to a reverse proxy server using a communication web page such that the reverse proxy server maps the URL of the to-be-shared web page and a URL of the communication web page to a sharing URL, and wherein the sharing URL comprises a sharing URL of the to-be-shared web page and a sharing URL of the communication web page;
receiving, by the first client, the sharing URL sent by the reverse proxy server;
acquiring, by the first client, a first to-be-shared web page according to the sharing URL, wherein the first to-be-shared web page comprises user background information of the first client;
sending, by the first client, the sharing URL to a second client such that the second client acquires a second to-be-shared web page according to the sharing URL, wherein the second to-be-shared web page does not comprise the user background information of the first client; and
sending, by the first client, a document object model (DOM) of the first client to the second client, wherein the DOM of the first client corresponds to the first to-be-shared web page such that the second client modifies a DOM of the second client according to the DOM of the first client and generates the first to-be-shared web page according to a modified DOM of the second client and the second to-be-shared web page.

2. The information sharing method of claim 1, wherein acquiring, by the first client, the first to-be-shared web page according to the sharing URL comprises:
acquiring, by the first client, a combined web page according to the sharing URL, wherein the communication web page and the to-be-shared web page are displayed on the combined web page, and wherein a URL of the combined web page is the sharing URL; and
acquiring, by the first client, the first to-be-shared web page using the combined web page and the user background information of the first client.

3. The information sharing method of claim 2, wherein acquiring, by the first client, the combined web page according to the sharing URL comprises:
embedding, by the first client, the to-be-shared web page into the communication web page according to the sharing URL of the communication web page and the sharing URL of the to-be-shared web page that are in the sharing URL to form the combined web page; or
receiving, by the first client using the sharing URL, the combined web page sent by the reverse proxy server, wherein the combined web page is generated by the reverse proxy server by inserting the communication web page into the to-be-shared web page in a plug-in manner.

4. The information sharing method of claim 2, wherein the user background information comprises a cookie and a session that correspond to the to-be-shared web page; and the method further comprises:
sending, by the first client, a request to the reverse proxy server using the combined web page to acquire the first to-be-shared web page, wherein the request comprises the cookie, and wherein the cookie comprises a session identifier (ID); and
receiving, by the first client, the first to-be-shared web page from the reverse proxy server, wherein the first to-be-shared web page is acquired from a shared website by the reverse proxy server according to the request.

5. The information sharing method of claim 4, further comprising sending, by the first client, a first page request to the reverse proxy server, wherein the first page request comprises the sharing URL of the to-be-shared web page and the cookie, and wherein the cookie comprises the session ID such that the reverse proxy server modifies the sharing URL of the to-be-shared web page to the URL of the to-be-shared web page to generate a second page request and sends the second page request to the shared website, and wherein receiving, by the first client, the first to-be-shared web page from the reverse proxy server comprises receiving, by the first client, a first page response, wherein the first page response comprises content of the first to-be-shared web page, and wherein the first page response is sent by the reverse proxy server to the first client according to a second page response returned by the shared website with respect to the second page request.

6. The information sharing method of claim 2, wherein the user background information comprises a cookie, a session, and user permission information that correspond to the to-be-shared web page, and the method further comprises:
sending, by the first client, a first page request to the reverse proxy server, wherein the first page request comprises the sharing URL of the to-be-shared web page, the cookie, and the user permission information, and wherein the cookie comprises an identifier ID of the session such that the reverse proxy server modifies the sharing URL of the to-be-shared web page to the URL of the to-be-shared web page to generate a second page request and sends the second page request to a shared website; and
receiving, by the first client, a first page response, wherein the first page response comprises content of the first to-be-shared web page, wherein the content of the first to-be-shared web page is determined by the shared website according to the user background information, and wherein the first page response is sent by the reverse proxy server to the first client according to a second page response returned by the shared website with respect to the second page request.

7. The information sharing method of claim 1, further comprising hiding, by the first client according to a setting, information that needs to be kept secret.

8. The information sharing method of claim 1, further comprising sending, by the first client, change information of the DOM of the first client to the second client when the first client determines that the DOM of the first client has changed such that the second client modifies the DOM of the second client according to the change information.

9. The information sharing method of claim 1, further comprising sending, to the second client and when detecting input information entered using an input device, the input information to prompt the second client to modify the DOM of the second client according to the input information.

10. An information sharing method, comprising:
receiving, by a second client, a sharing uniform resource locator (URL) sent by a first client, wherein the sharing URL is obtained by a reverse proxy server according to a URL of a to-be-shared web page and a URL of a communication web page, wherein the URL of the to-be-shared web page is sent by the first client using the communication web page, and wherein the sharing URL comprises a sharing URL of the to-be-shared web page and a sharing URL of the communication web page;
acquiring, by the second client, a second to-be-shared web page according to the sharing URL, wherein the second to-be-shared web page does not comprise user background information of the first client;
receiving, by the second client, a document object model (DOM) of the first client sent by the first client, wherein the DOM of the first client corresponds to a first to-be-shared web page, and wherein the first to-be-shared web page comprises the user background information of the first client;
modifying, by the second client, a DOM of the second client according to the DOM of the first client; and
generating, by the second client, the first to-be-shared web page according to a modified DOM of the second client and the second to-be-shared web page.

11. The information sharing method of claim 10, further comprising:
sending, by the second client, a first page request to the reverse proxy server, wherein the first page request comprises the sharing URL of the to-be-shared web page such that the reverse proxy server modifies the sharing URL of the to-be-shared web page to the URL of the to-be-shared web page to generate a second page request and sends the second page request to a shared website; and
receiving, by the second client, a first page response, wherein the first page response comprises content of the second to-be-shared web page, and wherein the first page response is sent by the reverse proxy server to the second client according to a second page response returned by the shared website with respect to the second page request.

12. The information sharing method of claim 10, further comprising:
receiving, by the second client, change information of the DOM of the first client and that is sent by the first client, and
modifying the DOM of the second client according to the change information, wherein the change information is sent by the first client to the second client when the DOM of the first client has changed.

13. The information sharing method of claim 10, further comprising:
receiving, by the second client, input information sent by the first client, and
modifying the DOM of the second client according to the input information, wherein the input information is sent by the first client to the second client when input information has been entered by a user using an input device.

14. An information sharing method implemented by a reverse proxy server, the method comprising:

receiving, from a first client using a communication web page, a uniform resource locator (URL) of a to-be-shared web page;

mapping the URL of the to-be-shared web page and a URL of the communication web page to a sharing URL, wherein the sharing URL comprises a sharing URL of the to-be-shared web page and a sharing URL of the communication web page; and sending, to the first client, the sharing URL to prompt the first client to acquire the to-be-shared web page according to the sharing URL and to prompt the first client to send the sharing URL to a second client so that the second client can acquire a second to-be-shared web page according to the sharing URL, wherein the to-be-shared web page comprises user background information of the first client, and wherein the second to-be-shared web page does not comprise the user background information of the first client.

15. The information sharing method of claim 14, wherein the user background information comprises a cookie and a session that correspond to the to-be-shared web page, and wherein the method further comprises:

receiving, from the first client, a request comprising, the cookie, wherein the cookie comprises a session identifier (ID);

acquiring, from a shared website according to the request, the to-be-shared web page; and sending, to the first client, the to-be-shared web page.

16. The information sharing method of claim 15, further comprising:

receiving, from the first client, a first page request, wherein the first page request comprises the sharing URL of the to-be-shared web page and the cookie, and wherein the cookie comprises the session ID;

modifying the sharing URL of the to-be-shared web page and in the first page request to the URL of the to-be-shared web page to generate a second page request;

sending, to the shared website, the second page request;

receiving, from the shared website, a second page response comprising the URL of the to-be-shared web page and content of the to-be-shared web page;

modifying the URL of the to-be-shared web page and in the second page response to the sharing URL of the to-be-shared web page to generate a first page response comprising the content of the to-be-shared web page; and sending, to the first client, the first page response.

17. The information sharing method of claim 14, wherein the user background information comprises a cookie, a session, and user permission information that correspond to the to-be-shared web page, and the method further comprises:

receiving, from the first client, a first page request comprising the sharing URL of the to-be-shared web page, the cookie, and the user permission information, wherein the cookie comprises an identifier ID of the session;

modifying the sharing URL of the to-be-shared web page and in the first page request to the URL of the to-be-shared web page to generate a second page request;

sending, to a shared website, the second page request;

receiving, from the shared website, a second page response comprising the URL of the to-be-shared web page and content of the to-be-shared web page, wherein the content of the to-be-shared web page is based on the user background information;

modifying the URL of the to-be-shared web page and in the second page response to the sharing URL of the to-be-shared web page to generate a first page response comprising the content of the to-be-shared web page; and sending, to the first client, the first page response.

18. A first client comprising:

a memory;

a system bus coupled to the memory; and a processor coupled to the system bus and configured to:

send a uniform resource locator (URL) of a to-be-shared web page to a reverse proxy server using a communication web page such that the reverse proxy server maps the URL of the to-be-shared web page and a URL of the communication web page to a sharing URL, wherein the sharing URL comprises a sharing URL of the to-be-shared web page and a sharing URL of the communication web page;

receive the sharing URL sent by the reverse proxy server;

acquire a first to-be-shared web page according to the sharing URL, wherein the first to-be-shared web page comprises user background information of the first client;

send the sharing URL to a second client such that the second client acquires a second to-be-shared web page according to the sharing URL, wherein the second to-be-shared web page does not comprise the user background information of the first client; and send a document object model (DOM) of the first client to the second client, wherein the DOM of the first client corresponds to the first to-be-shared web page such that the second client modifies a DOM of the second client according to the DOM of the first client and generates the first to-be-shared web page according to a modified DOM of the second client and the second to-be-shared web page.

19. The first client of claim 18, wherein the processor is further configured to:

acquire a combined web page according to the sharing URL, wherein the communication web page and the to-be-shared web page are displayed on the combined web page, and a wherein URL of the combined web page is the sharing URL; and acquire the first to-be-shared web page using the combined web page and the user background information of the first client.

20. The first client of claim 19, wherein the processor is further configured:

embed the to-be-shared web page into the communication web page according to the sharing URL of the communication web page and the sharing URL of the to-be-shared web page that are in the sharing URL to form the combined web page; or receive, using the sharing URL, the combined web page sent by the reverse proxy server, wherein the combined web page is generated by the reverse proxy server by inserting the communication web page into the to-be-shared web page in a plug-in manner.

21. The first client of claim 19, wherein the user background information comprises a cookie and a session that correspond to the to-be-shared web page, and wherein the processor is further configured to:

send a request to the reverse proxy server using the combined web page to acquire the first to-be-shared web page, wherein the request comprises the cookie, and wherein the cookie comprises a session identifier (ID); and receive the first to-be-shared web page from the reverse proxy server, wherein the first to-be-shared web page is acquired from a shared website by the reverse proxy server according to the request.

22. The first client of claim 21, wherein the processor is further configured to:

send a first page request to the reverse proxy server, wherein the first page request comprises the sharing URL of the to-be-shared web page and the cookie, and wherein the cookie comprises the session ID such that the reverse proxy server modifies the sharing URL of the to-be-shared web page to the URL of the to-be-shared web page to generate a second page request and sends the second page request to the shared website; and receive a first page response, wherein the first page response comprises content of the first to-be-shared web page, and wherein the first page response is sent by the reverse proxy server to the first client according to a second page response returned by the shared website with respect to the second page request.

23. The first client of claim 19, wherein the user background information comprises a cookie, a session, and user permission information that correspond to the to-be-shared web page, and wherein the processor is further configured to:

send a first page request to the reverse proxy server, wherein the first page request comprises the sharing URL of the to-be-shared web page, the cookie, and the user permission information, and wherein the cookie comprises an identifier (ID) of the session such that the reverse proxy server modifies the sharing URL of the to-be-shared web page to the URL of the to-be-shared web page to generate a second page request and sends the second page request to a shared website; and receive a first page response, wherein the first page response comprises content of the first to-be-shared web page, wherein the content of the first to-be-shared web page is determined by the shared website according to the user background information, and wherein the first page response is sent by the reverse proxy server to the first client according to a second page response returned by the shared website with respect to the second page request.

24. The first client of claim 18, wherein the processor is further configured to hide, according to a setting, information that needs to be kept secret.

25. The first client of claim 18, wherein the processor is further configured to send change information of the DOM of the first client to the second client when DOM of the first client has changed, such that the second client modifies the DOM of the second client according to the change information.

26. The first client of claim 18, wherein the processor is further configured to detect input information entered using an input device, and wherein sending the input information to the second client when detecting the input information entered using the input device such that the second client modifies the DOM of the second client according to the input information.

27. A second client comprising:
a memory;
a system bus coupled to the memory; and
a processor coupled to the system bus and configured to:

receive a sharing uniform resource locator (URL) sent by a first client, wherein the sharing URL is obtained by a reverse proxy server according to a URL of a to-be-shared web page and a URL of a communication web page, wherein the URL of the to-be-shared web page is sent by the first client using the communication web page, and wherein the sharing URL comprises a sharing URL of the to-be-shared web page and a sharing URL of the communication web page;

acquire a second to-be-shared web page according to the sharing URL, wherein the second to-be-shared web page does not comprise user background information of the first client;

receive a document object model (DOM) of the first client sent by the first client, wherein the DOM of the first client corresponds to a first to-be-shared web page, and wherein the first to-be-shared web page comprises the user background information of the first client;

modify a DOM of the second client according to the DOM of the first client; and generate the first to-be-shared web page according to a modified DOM of the second client and the second to-be-shared web page.

28. The second client of claim 27, wherein the processor is further configured to:

send a first page request to the reverse proxy server, wherein the first page request comprises the sharing URL of the to-be-shared web page such that the reverse proxy server modifies the sharing URL of the to-be-shared web page to the URL of the to-be-shared web page to generate a second page request and sends the second page request to a shared website; and receive a first page response, wherein the first page response comprises content of the second to-be-shared web page, and wherein the first page response is sent by the reverse proxy server to the second client according to a second page response returned by the shared website with respect to the second page request.

29. The second client of claim 27, wherein the processor is further configured to run the computer executable instruction to execute:

receive change information that is of the DOM of the first client and that is sent by the first client, wherein the change information is sent by the first client to the second client when the DOM of the first client has changed; and modify the DOM of the second client according to the change information.

30. The second client of claim 27, wherein the processor is further configured to:

receive input information sent by the first client, wherein the input information is sent by the first client to the second client when the input information has been entered by a user using an input device; and modify the DOM of the second client according to the input information.

31. A reverse proxy server comprising:
a memory;
a system bus coupled to the memory; and
a processor coupled to the system bus and configured to:

receive, from a first client using a communication web page, a uniform resource locator (URL) that is of a to-be-shared web page;

map the URL of the to-be-shared web page and a URL of the communication web page to a sharing URL, wherein the sharing URL comprises a sharing URL of the to-be-shared web page and a sharing URL of the communication web page; and send, to the first client, the sharing URL to prompt the first client to acquire the to-be-shared web page according to the sharing URL and to prompt the first client to send the sharing URL to a second client so that the second client can acquire a second to-be-shared web page according to the sharing URL, wherein the to-be-shared web page comprises user background information of the first client, and wherein the second to-be-shared web page does not comprise the user background information of the first client.

32. The reverse proxy server of claim 31, wherein the user background information comprises a cookie and a session that correspond to the to-be-shared web page, and wherein the processor is further configured to:

receive, from the first client, a request comprising, the cookie, wherein the cookie comprises a session identifier (ID);

acquire, from a shared website according to the request, the to-be-shared web page; and send, to the first client, the to-be-shared web page.

33. The reverse proxy server of claim 32, wherein the processor is further configured to:

receive, from the first client, a first page request comprising the sharing URL of the to-be-shared web page and the cookie, wherein the cookie comprises the session ID;

modify the sharing URL of the to-be-shared web page and in the first page request to the URL of the to-be-shared web page to generate a second page request;

send, to the shared website, the second page request;

receive, from the shared website, a second page response comprising the URL of the to-be-shared web page and content of the to-be-shared web page;

modify the URL of the to-be-shared web page and in the second page response to the sharing URL of the to-be-shared web page to generate a first page response comprising the content of the to-be-shared web page; and send, to the first client, the first page response.

34. The reverse proxy server of claim 31, wherein the user background information comprises a cookie, a session, and user permission information that correspond to the to-be-shared web page, and wherein the processor is further configured to:

receive, from the first client, a first page request comprising the sharing URL of the to-be-shared web page, the cookie, and the user permission information, wherein the cookie comprises an identifier (ID) of the session;

modify the sharing URL of the to-be-shared web page and in the first page request to the URL of the to-be-shared web page to generate a second page request;

send, to a shared website, the second page request;

receive, from the shared website, a second page response comprising the URL of the to-be-shared web page and content of the to-be-shared web page, and wherein the content of the to-be-shared web page is based on the user background information;

modify the URL of the to-be-shared web page and in the second page response to the sharing URL of the to-be-shared web page to generate a first page response, wherein the first page response comprises the content of the to-be-shared web page; and send, to the first client, the first page response.

* * * * *

UNITED STATES PATENT AND TRADEMARK OFFICE
CERTIFICATE OF CORRECTION

PATENT NO.         : 10,447,742 B2
APPLICATION NO.    : 15/358610
DATED              : October 15, 2019
INVENTOR(S)        : Zhihong Qiu, Li Li and Tao Cai It is certified that error appears in the above-identified patent and that said Letters Patent is hereby corrected as shown below:

In the Claims

Claim 15, Column 37, Line 24: "request comprising, the" should read "request comprising the"

Claim 17, Column 37, Line 52: "and the method" should read "and wherein the method"

Claim 29, Column 40, Line 42 and 43: "configured to run the computer executable instruction to execute:" should read "configured to:"

Claim 32, Column 41, Line 19: "request comprising, the" should read "request comprising the"

Signed and Sealed this
Tenth Day of December, 2019

Andrei Iancu
*Director of the United States Patent and Trademark Office*